United States Patent
Sakaguchi et al.

[11] Patent Number: 6,157,885
[45] Date of Patent: Dec. 5, 2000

[54] VEHICLE MOTIVE FORCE CONTROL SYSTEM

[75] Inventors: Shinichi Sakaguchi; Eisuke Kimura; Hiroyuki Abe; Makoto Kishida; Motoshi Ishikawa; Kazuhisa Yamamoto, all of Wako, Japan

[73] Assignee: Honda Giken Kogyo Kabushiki Kaisha, Tokyo, Japan

[21] Appl. No.: 09/221,852

[22] Filed: Dec. 29, 1998

[30] Foreign Application Priority Data

Jan. 9, 1998 [JP] Japan .................................. 10-015048

[51] Int. Cl.[7] .............................. G06F 17/00; G06F 19/00
[52] U.S. Cl. ................................ 701/54; 701/51; 701/84; 701/85; 477/46; 477/48
[58] Field of Search .................................. 701/62, 66, 52, 701/51, 54, 58, 84, 85, 87; 123/350, 361, 399; 477/3, 37, 43, 46, 48

[56] References Cited

U.S. PATENT DOCUMENTS

| | | | |
|---|---|---|---|
| 4,653,005 | 3/1987 | Osanai et al. | 701/62 |
| 4,836,056 | 6/1989 | Nakawaki et al. | 477/43 |
| 5,233,530 | 8/1993 | Shimada et al. | 701/107 |
| 5,285,111 | 2/1994 | Sherman | 290/4 C |
| 5,562,565 | 10/1996 | Moroto et al. | 477/3 |
| 5,609,544 | 3/1997 | Lardy et al. | 477/46 |
| 5,624,348 | 4/1997 | Lardy et al. | 477/46 |
| 5,833,570 | 11/1998 | Tabata et al. | 477/3 |
| 5,947,861 | 9/1999 | Nobumoto | 477/37 |

*Primary Examiner*—William A. Cuchlinski, Jr.
*Assistant Examiner*—Gertrude Arthur
*Attorney, Agent, or Firm*—Arent Fox Kintner Plotkin & Kahn, PLLC

[57] ABSTRACT

A system for controlling motive force of a vehicle having an engine and an automatic transmission connected to the engine to transmit engine torque to a drive shaft of the vehicle, wherein a control mode is selected from among a plurality of predetermined control modes in response to a calculated desired motive force and vehicle speed such that the fuel economy is enhanced and engine torque and speed (gear) ratio are controlled in response thereto. Moreover, the desired motive force is calculated by obtaining a difference between the wide-open-throttle motive force and the full-closed-throttle motive force and by multiplying the difference by a calculated ratio of motive force. Furthermore, the calculated desired output of the engine and the desired gear ratio are controlled such that the desired motive force is generated when the desired motive force is discriminated to be achievable. Thus, the engine and the automatic transmission are controlled in conjunction and the desired motive force is appropriately obtained. The speed (gear) ratio is changed to effect the desired motive force. With the arrangement, fuel economy and emission performance are enhanced.

23 Claims, 17 Drawing Sheets

VEHICLE MOTIVE FORCE CONTROL SYSTEM

BACKGROUND OF THE INVENTION

1. Field of the Invention

This invention relates to a motive force (power) control system for a vehicle equipped with an internal combustion engine and an automatic transmission, particularly to a vehicle motive force control system that optimizes vehicle fuel economy by integrated control of the engine and the automatic transmission.

2. Description of the Prior Art

Japanese Laid-Open Patent Application No. Hei 6(1994)-294,464 teaches a vehicle motive force control system. This prior art system uses the output speed of an automatic transmission (a continuously variable transmission or CVT), i.e., the rotational speed on the driven side of the transmission, which is proportional to the vehicle speed, and the accelerator pedal position as parameters for determining the desired the CVT output (driven side) torque, i.e., the output torque for optimum fuel economy, by retrieval from predefined (mapped) characteristics or by calculation.

The system further divides the retrieved desired CVT output (driven side) torque by the torque transmission ratio to calculate the desired CVT input torque, i.e., the desired engine output (torque). Next it uses the calculated desired engine output (torque) and the engine speed as address data for retrieving the desired quantity of fuel injection from another map (mapped data). The retrieved desired quantity of fuel injection and the engine speed are then used as address data for retrieving the desired throttle valve opening from a third map and the throttle valve is controlled to the desired opening by operating an actuator.

Japanese Laid-Open Patent Application No. Sho 61(1986)-119,856 (Patent Publication No. Hei 5(1993)-262,263) teaches a system for improving vehicle fuel economy by using the accelerator (pedal) position and vehicle speed as address data for retrieving the desired motive force (basic torque) from a prescribed map, correcting the desired motive force based on change in accelerator position etc., and determining the gear or speed ratio and the quantity of fuel injection (corrected) based on the corrected desired motive force.

These conventional systems are, however, not completely compatible with the various control systems and methods developed in recent years for improving fuel economy, which involve techniques such as exhaust gas recirculation (EGR) control in which a portion of the exhaust gas is recirculated to the intake system and lean-burn control in which the air/fuel ratio is regulated to be leaner than the stoichiometric air/fuel ratio. For example, these conventional systems are made ineffective by the fact that the optimum combination of engine torque and gear (speed) ratio relative to the same desired motive force does not necessarily remain the same when the control mode is changed from stoichiometric air/-fuel ratio control to the lean-burn control.

The conventional systems are based on the assumption that the engine is always controlled in the mode that provides the best fuel economy. They therefore invariably determine the same desired gear (speed) ratio for any given desired motive force (power). Because of this, they cannot always achieve the expected optimum fuel economy when the engine control mode is changed.

In other words, depending on the states or condition of the engine operation such as during warmup or learning control or due to changes in the environment external to the engine, it sometimes happens that the engine cannot be controlled in the desired mode. The control may also be restricted owing to emission considerations.

At any rate, the conventional systems do not determine the gear (speed) ratio in accord with the actual engine operating states and condition. They are therefore incapable of constantly maintaining optimum fuel economy irrespective of the actual engine operating states and condition.

SUMMARY OF THE INVENTION

This invention was accomplished for the purpose of overcoming the foregoing problems of the prior art and has as its object to provide a vehicle motive force control system that effects integrated control of the engine and the automatic transmission in accord with the actual operating states and condition of the engine, and can therefore constantly maintain optimum fuel economy regardless of the engine control mode.

Moreover, Japanese Laid-Open Patent Application No. Hei 7(1995)-172,217 teaches a vehicle motive force control system. This prior art system calculates maximum and minimum motive forces relative to the vehicle speed, the required effective motive force using the accelerator position (accelerator manipulated variable), and the driving resistance, and determines the desired motive force to be generated in the power train on the basis of the calculated values. Here, the prior art system calculates the required effective motive force by obtaining the difference between the calculated maximum and minimum motive forces, then by multiplying the difference by a coefficient (gain determined by the accelerator position and vehicle speed) and by adding the product to the calculated minimum motive force.

In the prior art system, however, since the gain is solely determined relative to the accelerator position, it is difficult to accurately determine the desired motive force relative to the vehicle speed and the accelerator manipulated variable. Moreover, the engine and the transmission are, in general, not free from a delay in the output relative to the input. Therefore, the determined desired motive force can not always be effected if the response delay of the engine and the transmission is not taken into account sufficiently. The prior art system leaves this to be improved.

Another object of the invention is therefore to provide a vehicle motive force control system which overcomes the foregoing problems of the prior art and which can determine the desired motive force accurately.

Still another object of the invention is therefore to provide a vehicle motive force control system which takes the response delay of the engine and the transmission into account to determine the desired motive force that the vehicle can reliably generate.

Furthermore, when the vehicles climbs a hill or runs at a high traveling speed, if the operator depresses the accelerator pedal significantly, requiring the power plant to generate higher output, since the engine load becomes higher the quantity of fuel injection is enriched relative to that when the air/fuel ratio is controlled to the stoichiometric air/fuel ratio, such that the exhaust gas temperature is lowered, thus degrading fuel economy and emissions performance.

In order to solve this problem, Japanese Patent Publication No. Hei 7(1995)-81,535 teaches fuel economy saving means comprising a switch which is manipulated by the operator when he wishes to drive the vehicle with less fuel consumption, and when the switch is manipulated, controlling the throttle opening such that the engine load is limited to a value not more than that generated immediately before the engine has entered the high load region where the enrichment is needed. The prior art thus teaches regulating the throttle opening to less than that required under high engine load.

The prior art is disadvantageous, however, in that the operator must judge whether the switch should be manipulated so as to save fuel economy, rendering the configuration complex and needing the operator's manipulation of the switch.

Yet another object of the invention is therefore to provide a vehicle motive force control system which can make this judgement appropriately and effect the required engine output, without the assistance of operator manipulation, while enhancing the fuel economy and emissions performance.

The present invention achieves the first object by providing a system for controlling motive force of a vehicle having an engine and an automatic transmission connected to the engine to transmit engine torque to a drive shaft of the vehicle, comprising: operating condition detecting means for detecting operating conditions of the vehicle including at least an accelerator position and a vehicle speed, and operating conditions of the engine including at least an engine warmup state, an engine speed and an engine load; desired motive force determining means for determining a desired motive force to be generated by the vehicle based on at least the detected accelerator position and vehicle speed; option signal generating means for generating options signal in response to the detected engine operating condition; control mode selecting means for selecting one from among a plurality of predetermined control modes in response to the determined desired motive force and the options signal; desired engine output calculating means for calculating a desired output of the engine and a manipulated variable to be supplied to the automatic transmission in accordance with the selected control mode based on at least the calculated desired motive force; actuator control means for controlling operation of an actuator which regulates the output of the engine in response to the calculated desired output of the engine; and shift control means for controlling a gear ratio of the automatic transmission in response to the calculated manipulated variable.

The present invention achieves the second and third objects by providing, in addition to the aspects described above, a system wherein the desired motive force determining means includes: wide-open-throttle motive force calculating means for calculating a wide-open-throttle motive force generated based at least on the detected vehicle speed when a throttle valve of the engine is fully opened; full-closed-throttle motive force calculating means for calculating a full-closed-throttle motive force generated based at least on the detected vehicle speed when a throttle valve of the engine is fully closed; motive force ratio calculating means for calculating a ratio of motive force at the detected vehicle speed relative to the detected accelerator position; and desired motive force calculating means for calculating the desired motive force by obtaining a difference between the wide-open-throttle motive force and the full-closed-throttle motive force and by multiplying the difference by the calculated ratio of motive force.

Similarly, the present invention is further configured to provide a system wherein the desired motive force determining means further includes: error calculating means for calculating an error between the desired motive force calculated currently and that calculated previously; and desired motive force correcting means for correcting the currently calculated desired motive force by the calculated error.

The present invention achieves the third object by providing a system for controlling motive force of a vehicle having an engine and an automatic transmission connected to the engine to transmit engine torque to a drive shaft of the vehicle, comprising: operating condition detecting means for detecting operating conditions of the vehicle including at least an accelerator position and a vehicle speed, and operating conditions of the engine including at least an engine warmup state, an engine speed and an engine load; desired motive force determining means for determining a desired motive force to be generated by the vehicle based on at least the detected accelerator position and vehicle speed; desired engine output calculating means for calculating a desired output of the engine and a desired gear ratio of the automatic transmission based on at least the determined desired motive force and the detected engine operating conditions; high engine load determining means for determining whether the engine is under high load; discriminating means for discriminating whether the calculated gear ratio can achieve the determined desired motive force; changing means for changing the calculated desired output of the engine and the desired gear ratio when the determined desired motive force can be achieved; actuator control means for controlling operation of an actuator which regulates the output of the engine in response to the desired output of the engine; and shift control means for controlling a gear ratio of the automatic transmission in response to the desired gear ratio.

BRIEF EXPLANATION OF THE DRAWINGS

These and other objects and advantages of the present invention will be made more apparent with the following description and drawings, in which.

DETAILED DESCRIPTION OF THE PREFERRED EMBODIMENTS

An embodiment of the invention will now be explained with reference to the attached drawings.

Figure 1:
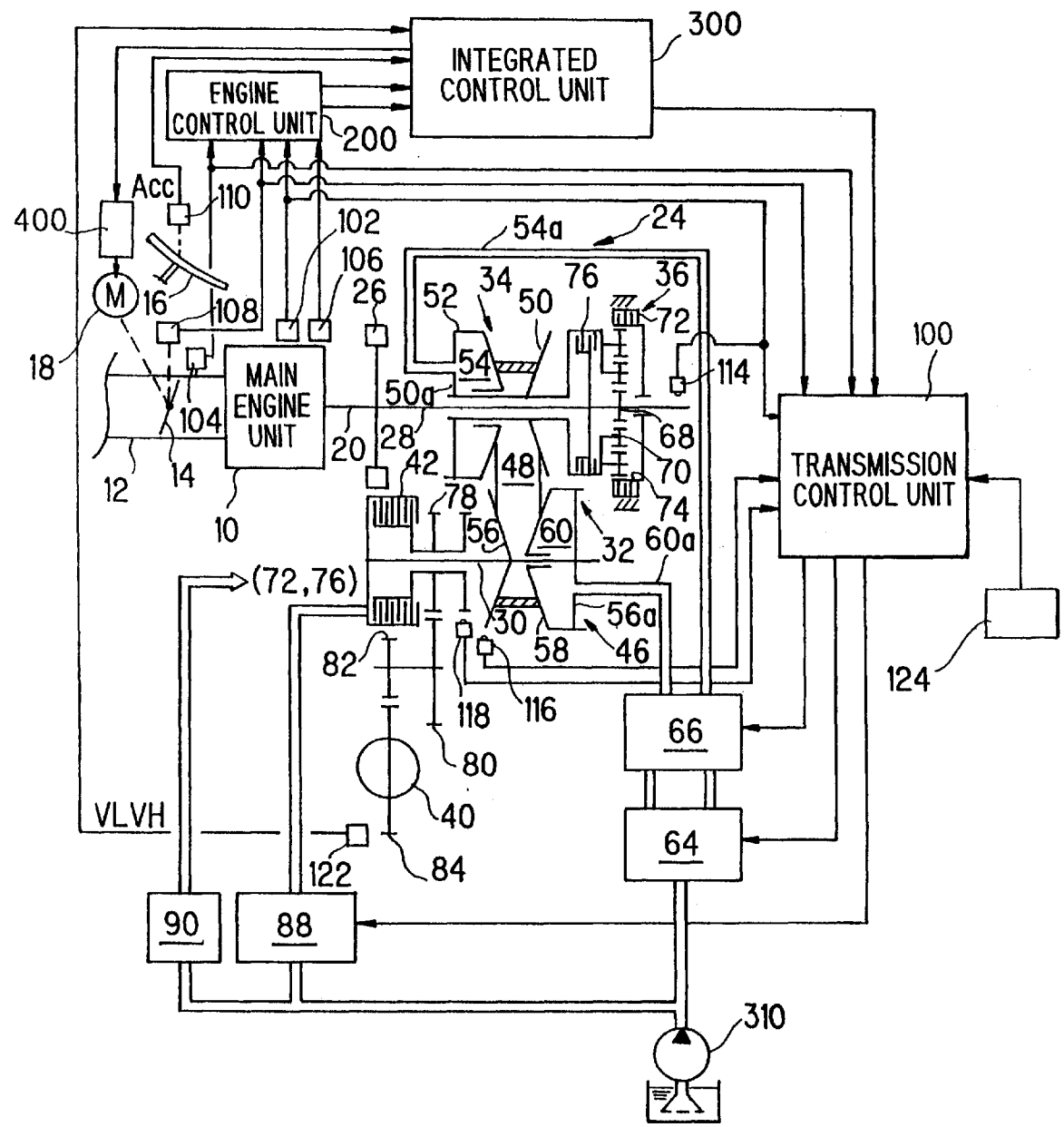
FIG. 1 is an overall schematic view of a vehicle motive force control system according to the present invention.

FIG. 1 is an overall schematic view of a vehicle motive force control system according to the invention. The automatic transmission in the illustrated embodiment is a belt-drive continuously variable transmission (CVT).

Reference numeral 10 in this figure designates an internal combustion engine, more precisely the main unit of the engine. A throttle valve 14 is installed in an air intake pipe 12 connected to the engine 10. The throttle valve 14 is not mechanically linked to an accelerator pedal 16 located on the floor of the vehicle near the operator's seat (not shown), but is connected to a stepper motor 18 and is opened and closed by the output of the stepper motor 18 connected therewith. The engine 10 is equipped with an EGR (exhaust gas recirculation) system (not shown).

The output shaft (crankshaft) 20 of the engine 10 is connected to a continuously variable transmission (CVT) 24. Specifically, an output shaft 20 of the engine 10 is connected through a dual-mass flywheel 26 to an input shaft 28 of the transmission 24.

The transmission 24 comprises a metal V-belt mechanism 32 located between the input shaft 28 and a counter-shaft 30, a planetary gear-type forward/reverse switching mechanism 36 located between the input shaft 28 and a drive-side movable pulley 34, and a start (drive-away) clutch 42 located between the counter-shaft 30 and a differential 40. Driving power transmitted to the differential 40 is transmitted to left and right drive wheels (not shown) through a drive shaft (not shown).

The metal V-belt mechanism 32 comprises the drive-side movable pulley 34 mounted on the input shaft 28, a driven-side movable pulley 46 mounted on the counter-shaft 30, and a metal V-belt 48 wound about the two pulleys. The drive-side movable pulley 34 comprises a fixed pulley half 50 mounted on the input shaft 28 and a movable pulley half 52 movable relative to the fixed pulley half 50 in the axial direction.

On the side of the movable pulley half 52 is formed a drive-side cylinder chamber 54, enclosed by a cylinder wall 50a and connected to the fixed pulley half 50. Oil pressure supplied to the drive-side cylinder chamber 54 through an oil line 54a produces lateral pressure for moving the movable pulley half 52 in the axial direction.

The driven-side movable pulley 46 comprises a fixed pulley half 56 mounted on the counter-shaft 30 and a movable pulley half 58 movable relative to the fixed pulley half 56 in the axial direction. On the side of the movable pulley half 58 is formed a driven-side cylinder chamber 60, enclosed by a cylinder wall 56a and connected to the fixed pulley half 56. Oil pressure supplied to the driven-side cylinder chamber 60 through an oil line 60a produces lateral pressure for moving the movable pulley half 58 in the axial direction.

A regulator valve group 64 is provided for determining pulley control oil pressure supplied to the drive-side cylinder chamber 54 and the driven-side cylinder chamber 60, and a shift control valve group 66 is provided for supplying the pulley control oil pressure to the cylinder chambers 54 and 60. The valve groups determine appropriate lateral pulley pressures, at which no V-belt 48 slip occurs, and vary the pulley width of the pulleys 34, 46 to vary the radius of the V-belt 48 wound about the pulleys 34, 46, thereby continuously varying the speed (gear) ratio.

The planetary gear-type forward/reverse switching mechanism 36 comprises a sun gear 68 connected to the input shaft 28, a carrier 70 connected to the fixed pulley half 50, a ring gear 74 that can be immobilized by a reverse brake 72, and a forward clutch 76 that can connect the sun gear 68 and the carrier 70.

When the forward clutch 76 engages, all gears rotate unitarily with the input shaft 28 to drive the drive-side movable pulley 34 in the same direction (forward) as the input shaft 28. When the reverse brake 72 engages, the ring gear 74 is immobilized so that the carrier 70 is driven reversely from the sun gear 68 and the drive-side movable pulley 34 is driven in the opposite direction (reverse) from the input shaft 28. When both the forward clutch 76 and the reverse brake 72 disengage, the transmission of power through the forward/reverse switching mechanism 36 is cut off and no power is transmitted between the engine 10 and the drive-side pulley 34.

The start clutch 42 is for ON/OFF (engage/disengage) control of power transmission between the counter-shaft 30 and the differential 40. When the start clutch 42 is made ON (engaged), the engine output varied in speed ratio by the metal V-belt mechanism 32 is transmitted through gears 78, 80, 82 and 84 to the differential 40, which divides and transmits it to the left and right drive wheels (not shown). When the start clutch 42 is made OFF (disengaged), the transmission assumes a neutral state.

The operation of the start clutch 42 is controlled by a clutch control valve 88, and the operation of the reverse brake 72 and the forward clutch 76 of the forward/reverse switching mechanism 36 is controlled by a manual shift valve 90 in response to the operation of a manual shift lever (not shown).

The valve groups are controlled based on control signals from a transmission control unit 100, comprised of a microcomputer.

A crank angle sensor 102 is provided at an appropriate location in the engine 10, such as near the cam shaft (not shown), and outputs a signal proportional to the crank angle (which is counted and used to calculate the engine speed NE). A manifold absolute pressure sensor 104 is installed in the air intake pipe 12 at an appropriate location downstream of the throttle valve 14 and outputs a signal proportional to the manifold absolute pressure PBA in the air intake pipe (the engine load). A coolant temperature sensor 106 is provided at an appropriate location on the cylinder block (not shown) and outputs a signal proportional to the engine coolant temperature TW.

A throttle position sensor 108 is installed near the throttle valve 14 and outputs a signal proportional to the throttle opening θTH and an accelerator position sensor 110 is provided near the accelerator pedal 16 and outputs a signal proportional to the accelerator (pedal) position ACC to which the operator has depressed the accelerator pedal 16.

In the transmission 24, a speed sensor 114 is provided near the input shaft 28 and outputs a signal proportional to the rotational speed NDR of the input shaft 28. A speed sensor 116 is provided near the driven-side movable pulley 46 and outputs a signal proportional to the rotational speed of the driven-side movable pulley 46, i.e., the rotational speed NDN of the input shaft of the drive-away clutch 42 (the counter-shaft 30). A speed sensor 118 is provided near the gear 78 and outputs a signal proportional to the rotational speed of gear 78, i.e., the rotational speed NOUT of the output shaft of the drive-away clutch 42.

A vehicle speed sensor 122 is provided near the drive shaft (not shown) connected to the differential 40 and outputs a signal proportional to the vehicle speed (road speed) VLVH. A shift lever position switch 124 is provided in the vicinity of the shift lever (not shown) installed on the vehicle floor near the operator's seat and outputs a signal proportional to the range position (D, N, P . . . ) selected by the operator.

In addition to having the transmission control unit 100 mentioned earlier, the system is also equipped with an engine control unit 200 which is comprised of a microcomputer. The outputs of the crank angle sensor 102, the manifold absolute pressure sensor 104, the coolant temperature sensor 106 and the throttle position sensor 108 are forwarded to both of the control units 100 and 200.

The system is also equipped with an integrated control unit 300 which is comprised of a microcomputer. The outputs of the accelerator position sensor 110 and the vehicle speed sensor 122 are sent to the integrated control unit 300.

Figure 2:
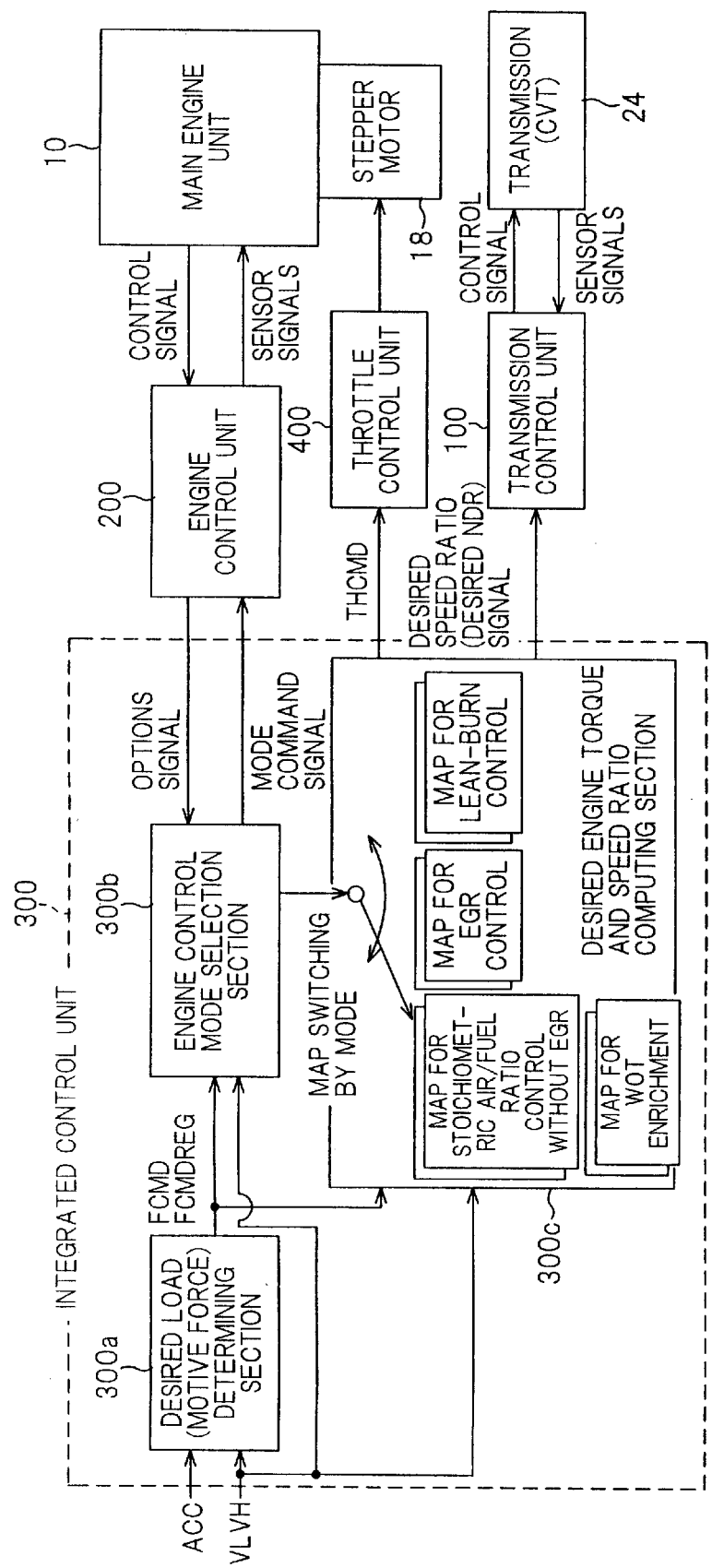
FIG. 2 is a block diagram functionally showing the configuration of the system illustrated in FIG. 1.

FIG. 2 is a block diagram functionally showing the configuration of the system, in particular the integrated control unit 300.

The integrated control unit 300 has a desired load (motive force) determining section 300a, an engine control mode selection section 300b and a desired engine torque and desired speed (gear) ratio computing section 300c. The desired load (motive force) determining section 300a receives the signal indicative of ACC and VLVH from the accelerator position sensor 110 and the vehicle speed sensor 122 and, as further explained later, determines the desired engine load, more specifically the desired motive force (power) FCMD to be output by the vehicle, from prescribed (mapped) characteristics using the detected accelerator position ACC and vehicle speed VLVH as address data.

The engine control mode selection section 300b effects engine control mode selection based on the vehicle speed VLVH, the desired motive force FCMD (FCMDREG) and an engine control mode options signal (engine operating condition signal; explained later) received from the engine control unit 200 and sends an engine control mode command to the engine control unit 200, and to the desired engine torque and desired speed (gear) ratio computing section 300c.

The desired engine torque and desired speed (gear) ratio computing section 300c includes multiple maps (mapped data). Using the map associated with the engine control mode designated by the engine control mode command, the desired engine torque and desired speed (gear) ratio computing section 300c determines the desired engine torque, more specifically the desired throttle opening THCMD, and sends it to a throttle control unit 400. Based on the desired throttle opening THCMD, the throttle control unit 400 determines a manipulated variable to drive the stepper motor 18. This controls the engine to the desired torque.

The desired engine torque and desired speed (gear) ratio computing section 300c also uses the map associated with the engine control mode designated by the engine control mode command to decide the desired speed (gear) ratio, more specifically the desired NDR (NDRCMD), i.e., it determines the desired value of the input rotational speed NDR, and sends it to the transmission control unit 100.

The transmission control unit 100 drives the movable pulleys 34, 46 as explained earlier to control the speed (gear) ratio such that the input rotational speed converges to the desired NDR. The desired NDR is the desired rotational speed of the drive-side movable pulley 34 of the transmission 24 and the speed (gear) ratio is uniquely determined and controlled by defining the desired NDR relative to the vehicle speed VLVH.

The multiple maps (mapped data) provided in the desired engine torque and desired speed (gear) ratio computing section 300c are of four types corresponding to four control modes, namely, in order of increasing fuel consumption: lean-burn control (where the air/fuel ratio is controlled to be leaner than the stoichiometric air/fuel ratio), stoichiometric air/fuel ratio control with EGR, stoichiometric air/fuel ratio control without EGR, and WOT (wide-open-throttle) enrichment control during high load. Each map is defined based on experimental results to enable use of the current vehicle speed VLVH and desired motive force FCMD as address data for retrieving the throttle valve opening and speed (gear) ratio, more precisely the combination of throttle valve opening and speed (gear) ratio, at which fuel economy is maximum.

The operation of the system will now be explained.

Figure 3:
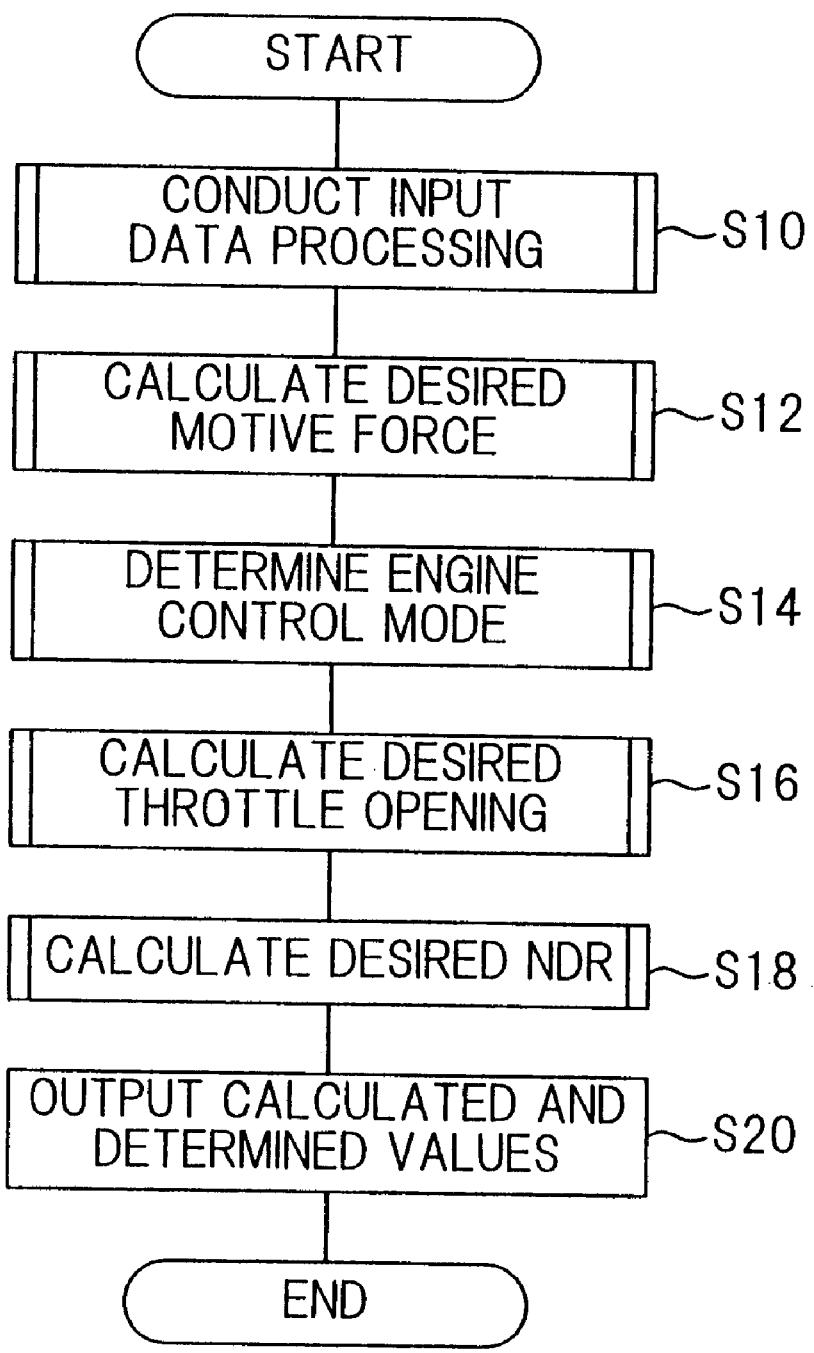
FIG. 3 is a flow chart showing the operation of the system illustrated in FIG. 1.

FIG. 3 is a flow chart showing the operation of the system. The illustrated program is executed by the integrated control unit 300 at prescribed intervals, e.g., once every 20 msec.

First, input data processing is conducted in S10.

Figure 4:
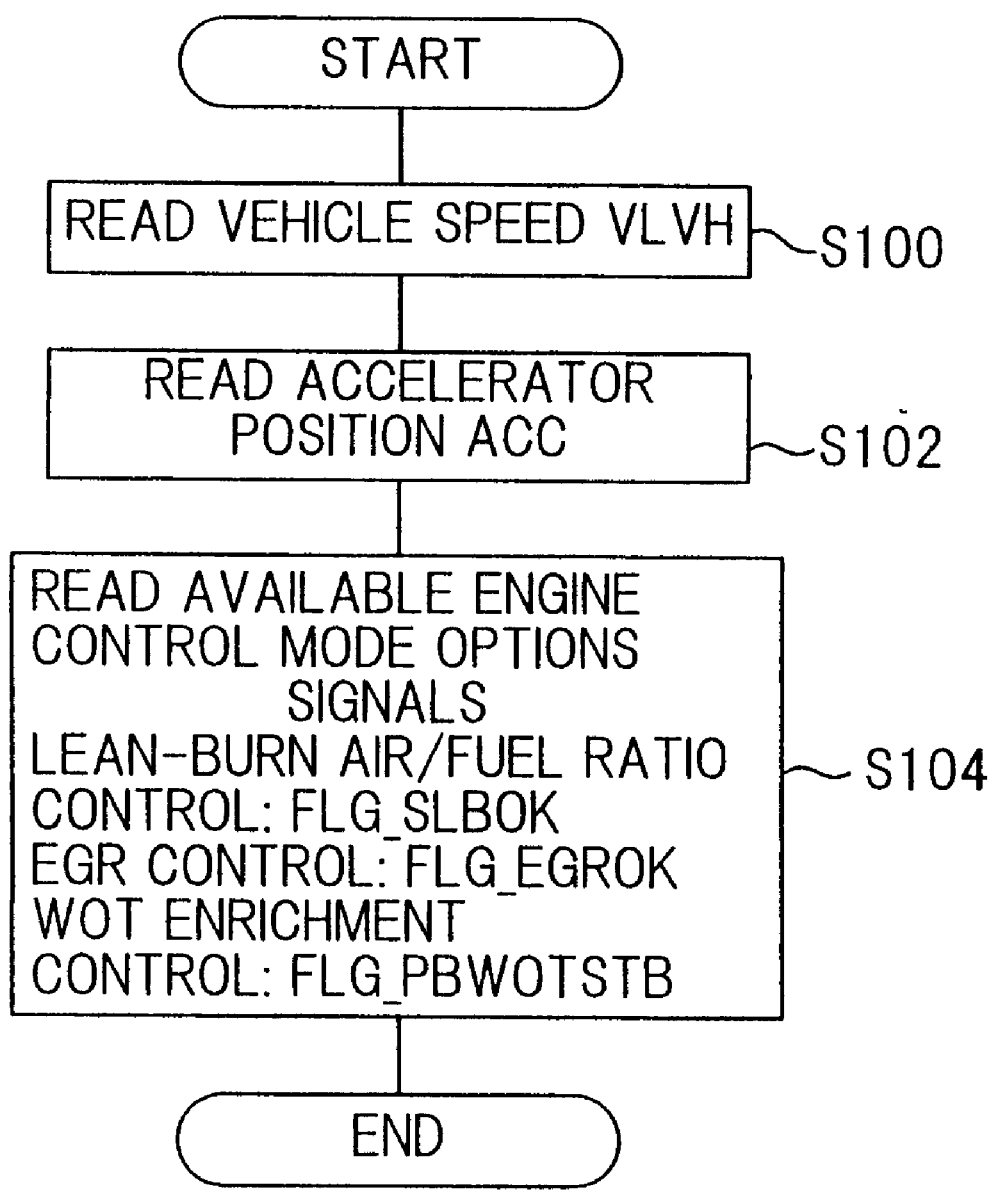
FIG. 4 is a flow chart showing the subroutine of input data processing referred to in the flow chart of FIG. 3.

The subroutine for this is shown in the flow chart of FIG. 4.

The vehicle speed VLVH detected by the vehicle speed sensor 122 is read in S100, the accelerator (pedal) position ACC detected by the accelerator position sensor 110 is read in S102, and the available engine control mode options signal produced by the engine control unit 200 is read in S104.

Based on the coolant temperature TW (warmup state), the engine speed NE, the engine load (manifold absolute pressure) PBA and other parameters indicative of the engine operating condition, the engine control unit 200 determines which among EGR implementation (control), lean-burn control and the like are possible and sends the result of its determination to the engine control mode selection section 300b as a signal indicating the available options (the options signal).

Specifically, the options signal comprises the flags FLG_SLBOK (lean-burn control), FLG_EGROK (EGR control) and FLG_PBWOTSTB (WOT enrichment standby). The engine control mode selection section 300b acquires the pertinent information by checking these flag bits. When set (bit=1), the flags respectively indicate "lean-burn control possible," "EGR control possible," and "WOT enrichment standby in effect." When reset (bit=0), they have the opposite meanings.

Next, in S12 of FIG. 3, the desired motive force FCMD is calculated or determined.

Figure 5:
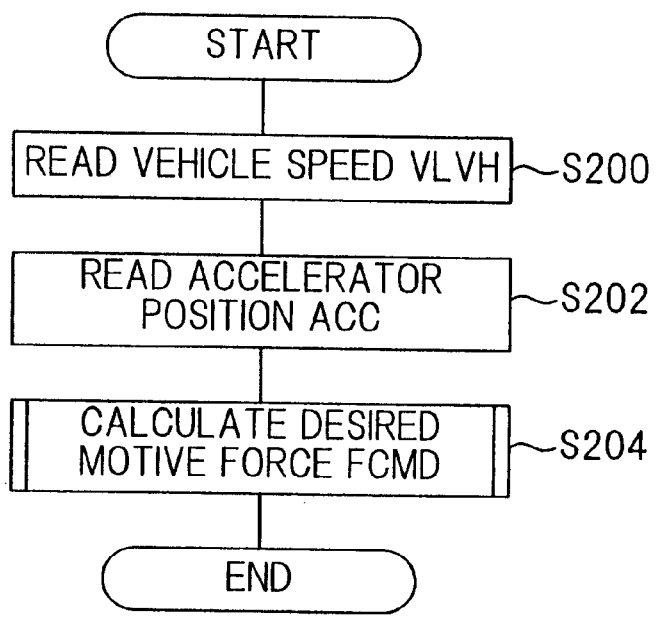
FIG. 5 is a flow chart showing the subroutine of desired motive force calculation referred to in the flow chart of FIG. 3.

The subroutine for this is shown in the flow chart of FIG. 5.

Figure 6:
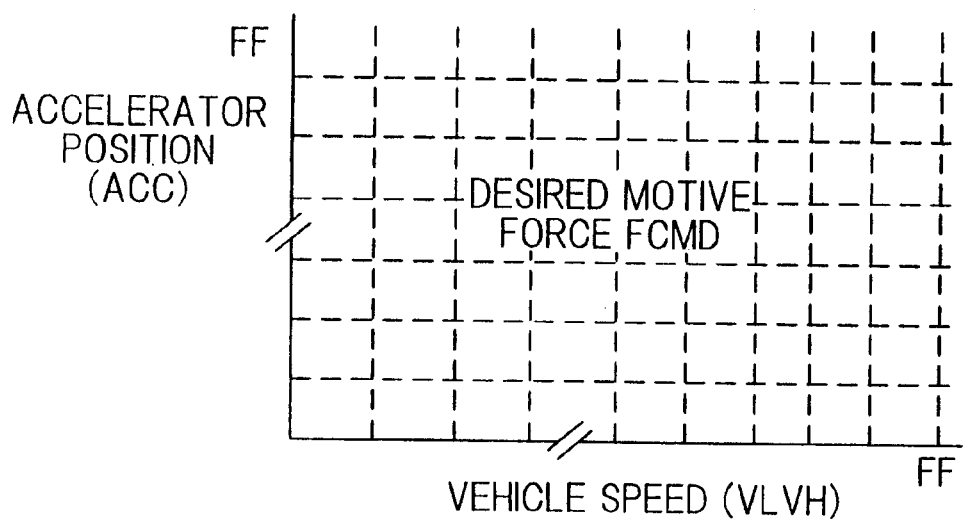
FIG. 6 is an explanatory graph showing the characteristics of a map referred to in the flow chart of FIG. 5.

The vehicle speed VLVH is read in S200 and the accelerator (pedal) position ACC is read in S202. In S204, the read values are used as address data to retrieve the desired motive force FCMD from the map (mapped characteristics) shown in FIG. 6.

Figure 7:
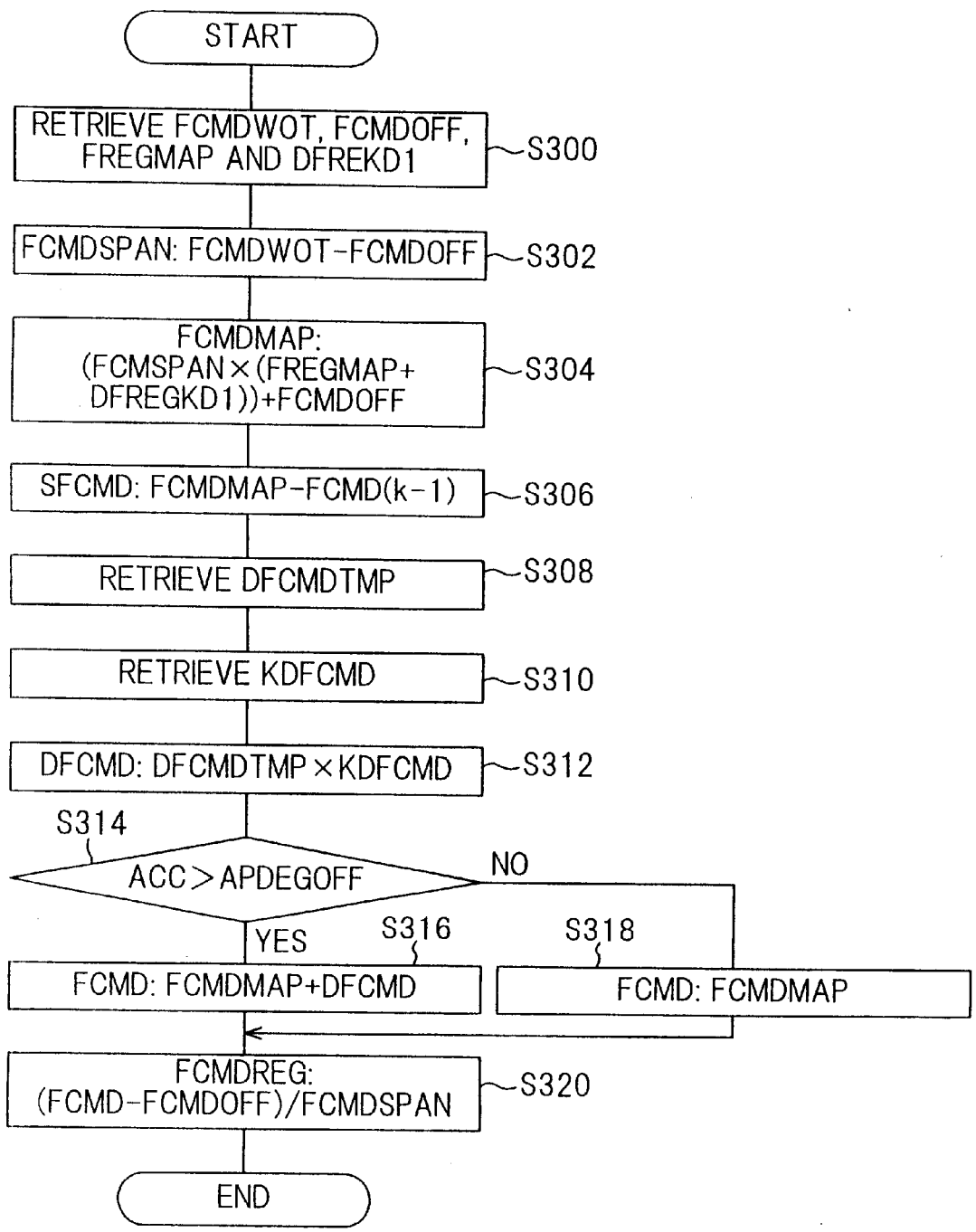
FIG. 7 is a flow chart showing the desired motive force calculation shown in the flow chart of FIG. 5 in greater detail.
Figure 8:
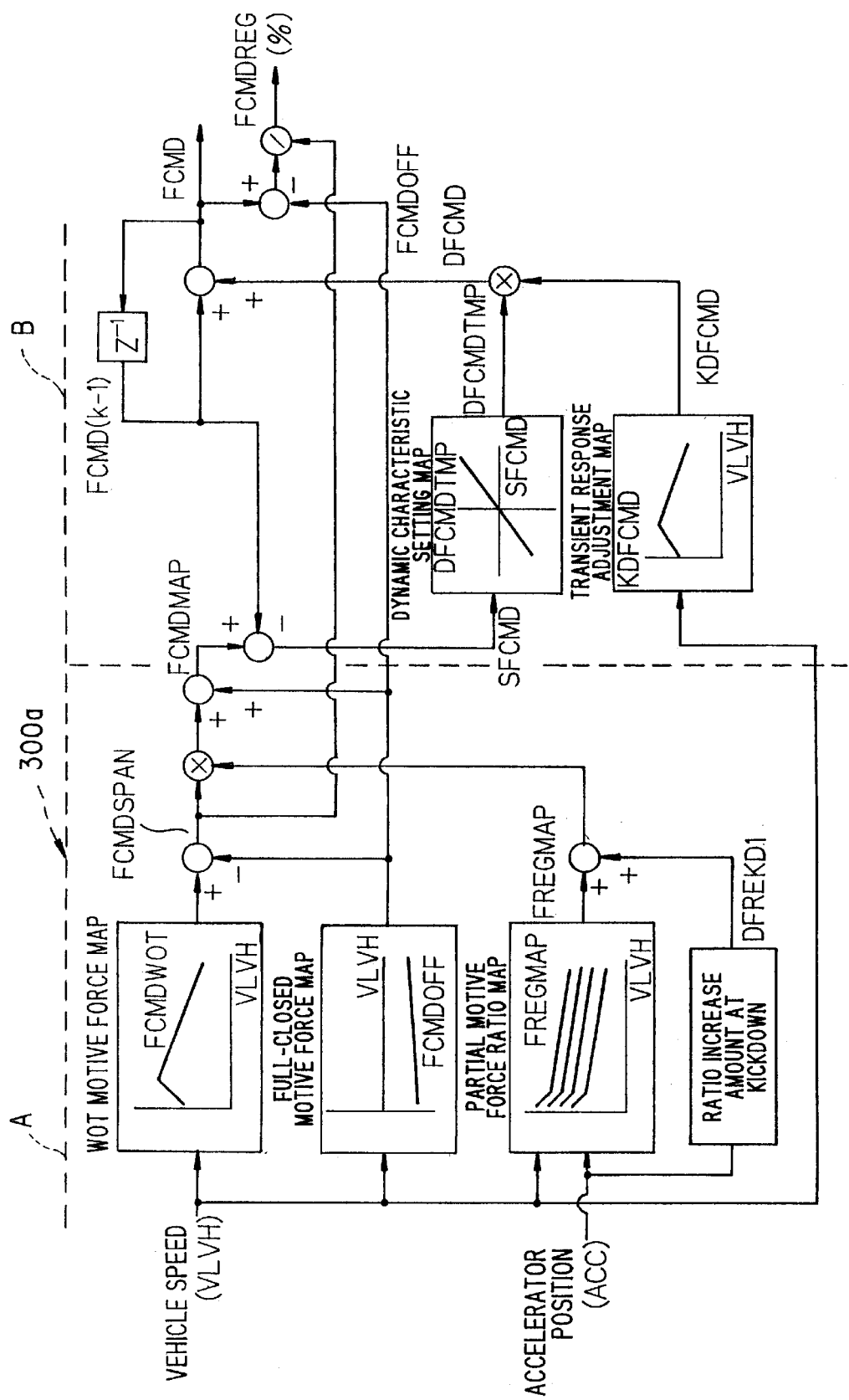
FIG. 8 is a block diagram functionally showing the processing shown in the flow chart of FIG. 7.

The subroutine of FIG. 7 shows the procedure in greater detail, and FIG. 8 is a block diagram for explaining the processing by the subroutine of FIG. 7. As illustrated, the desired load (motive force) determining section 300a is composed of a steady-state motive force computing section A and a dynamic characteristic computing section B.

In S300 of FIG. 7, the read vehicle speed VLVH and accelerator (pedal) position ACC are used as address data to retrieve the motive force at WOT (wide-open-throttle) FCMDWOT (kgf), motive force at full-closed-throttle FCMDOFF (kgf), a partial motive force ratio (normalized desired motive force) FREGMAP (%) and a ratio increase amount for kickdown DFREKD1 from maps (mapped data), whose characteristics are shown in FIG. 8, excepting the map detail for DFREKD1.

The motive force at WOT map and the motive force at full-closed-throttle map (respectively referred to in FIG. 8 as WOT Motive Force Map and Full Closed Motive Force Map) define the obtainable maximum motive force FCMDWOT and obtainable minimum motive force FCMDOFF as a function of vehicle speed VLVH. The partial motive force ratio (normalized desired motive force) map defines the ratio of motive force, normalized between the maximum and minimum motive forces, as a function of accelerator position ACC for different vehicle speeds VLVH. When the rate of accelerator pedal depression is great, i.e., when accelerator position change rate ΔACC (first-order difference of accelerator position ACC) is large, the accelerator position change rate ΔACC is used as address data to retrieve the ratio increase amount for kickdown DFREKD1 corresponding to a kickdown operation from a map (not shown). This is because rapid depression of the accelerator pedal can be assumed to mean that the operator wants a sudden increase in motive force.

Next, in S302, the full-closed-throttle motive force FCMDOFF is subtracted from the WOT motive force FCMDWOT to obtain the difference FCMDSPAN. A desired steady-state driving force FCMDMAP is then calculated by multiplying the calculated difference FCMDSPAN by the sum of the partial motive force ratio FREGMAP and the ratio increase amount for kickdown DFREKD1 and adding the full-closed-throttle motive force FCMDOFF to the product.

Next, in S306, FCMD(k−1), i.e., the value of FCMD in the preceding cycle, is subtracted from the calculated value of FCMDMAP to obtain the difference (error) SFCMD. The notation (k−1) here indicates that the value is that in Z transformation at the discrete sample number in the preceding circle, more specifically that it is the value at the time of execution of the program of FIG. 3 in the preceding cycle. (In the interest of simpler notation, (k) is not affixed to current cycle values.)

In the following step S308, the calculated difference SFCMD is used as address data to retrieve the value DFCMDTMP from a dynamic characteristic setting map (whose characteristics are shown in FIG. 8). This dynamic characteristic setting map defines a desired motive force response adjustment term DFCMDTMP as a function of the difference SFCMD between preceding cycle desired motive force FCMD(k−1) and current cycle desired motive force FCMD.

Next, in S310, the vehicle speed VLVH is used as address data to retrieve a value KDFCMD from a transient response adjustment map (whose characteristics are shown in FIG. 8). This transient response adjustment map defines a correction coefficient KDFCMD for the desired motive force response adjustment term DFCMDTMP as a function of the vehicle speed. Then, in S312, a desired motive force response adjustment term DFCMD is calculated by multiplying the retrieved values DFCMDTMP and KDFCMD.

Next, in S314, it is checked whether the detected accelerator position ACC is greater than a prescribed value APDEGOFF (corresponding to the full-closed-throttle position). In other words, a check is made to see whether the accelerator pedal is in a position other than a substantially not-depressed position. When the result is YES, the sum of FCMDMAP and DFCMD (i.e., value after dynamic characteristic adjustment) is determined as the desired motive force FCMD in S316. When the result is NO, FCMDMAP (i.e., the value before dynamic characteristic adjustment) is determined as the desired motive force FCMD in S318.

Then, in S320, FCMDOFF and FCMDSPAN are used to modify the desired motive force FCMD after dynamic characteristic adjustment to a normalized amount FCMDREG (%) and the subroutine is terminated.

As will be understood from the foregoing, the motive force characteristics mapped as a function of the vehicle speed and accelerator pedal position are those of the normalized desired motive force. The reason for this is that defining the maps in terms of the actual motive force with the map grid nodes established based on the maximum motive force would make the retrieval resolution coarse on the minimum motive force side because the maximum motive force the vehicle can achieve is high at low vehicle speeds and low at high speeds. The desired motive force is therefore normalized over the full range. By this the resolution of the output relative to the accelerator (pedal) position is made uniform at all vehicle speeds.

Moreover, as illustrated in FIG. 8, the desired load (motive force) determining section is established as discrete units A, B, wherein A refers to the steady-state motive force computing section, and B to the dynamic characteristic computing section. The reason for this will next be explained.

When the change rate of the desired motive force is excessively large, the engine torque response and the rate of transmission speed (gear) ratio change may not be able to keep up. Cases may therefore arise in which the requirements of the determined characteristic cannot be satisfied. Conceivably, such a situation can be handled by calculating the actual motive force for the desired motive force and effecting feedback control by engine torque correction. However, this complicates the system configuration.

Another problem with this approach is that it alters the preset relationship between the engine torque and the speed (gear) ratio and by this shifts the engine operating point away from that of optimum fuel economy. Moreover, since what the operator actually wants is not a sudden step-like change in motive force, better response to the operator's desire and improved drivability can be achieved by gradually responding to the requested output under steady-state.

Therefore, as shown in FIG. 8, the steady-state motive force computing section A and the dynamic characteristic computing section B are separately configured and the rate of desired motive force change is limited by having the steady-state motive force computing section A compute that part of the requested (desired) motive force desired to be attained along a steady-state characteristics curve at the given accelerator pedal position and vehicle speed, and having the dynamic characteristic computing section B compute the transient curve portion defining how the response will effect such motive force.

In other words, the dynamic characteristic computing section B takes into account the response of the engine and transmission and computes the desired motive force by correcting the steady-state motive force requested by the steady-state motive force computing section A so as to satisfy the dynamic characteristic of the motive force. By this configuration, control can be achieved that constantly tracks the combination of engine torque and speed (gear) ratio, providing optimum fuel economy while maintaining good drivability.

Further, when the accelerator pedal is in a position corresponding to full-closed-throttle position, intention to decelerate is promptly ascertained since only the steady-state characteristic portion of the desired motive force is utilized, while when the accelerator pedal position is not full-closed, the transient response characteristic is adjusted for the vehicle speed. The vehicle motive force characteristics can therefore be freely set with a simply configured system.

Next, in S14 of FIG. 3, the engine control mode is determined.

Specifically, the control mode offering the best fuel economy is selected based on the control mode options signal from the engine control unit 200, i.e., based on the bits of the flags FLG_EGROK, FLG_SLBOK etc. Still more specifically, the decision is made by retrieval from a region map (whose characteristics are established as shown in FIG. 9), using the calculated desired motive force FCMD and the vehicle speed VLVH as address data.

Figure 9:
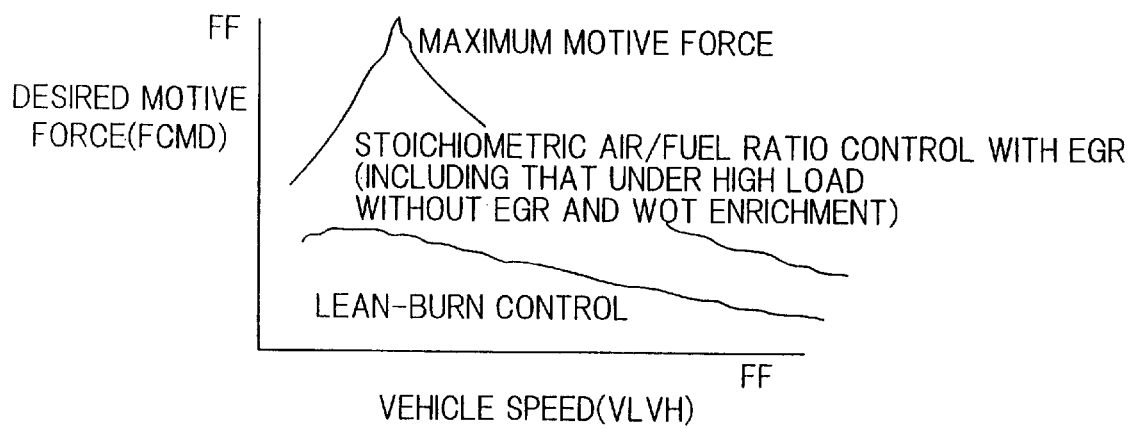
FIGS. 9 to 11 are explanatory graphs explaining control mode selection referred to in the flow chart of FIG. 3.

The control mode offering the best fuel economy is thus selected from among the currently available control mode options received from the engine control unit 200 based on vehicle load factors, i.e., the desired motive force and the vehicle speed, as shown in FIG. 9.

Figure 10:
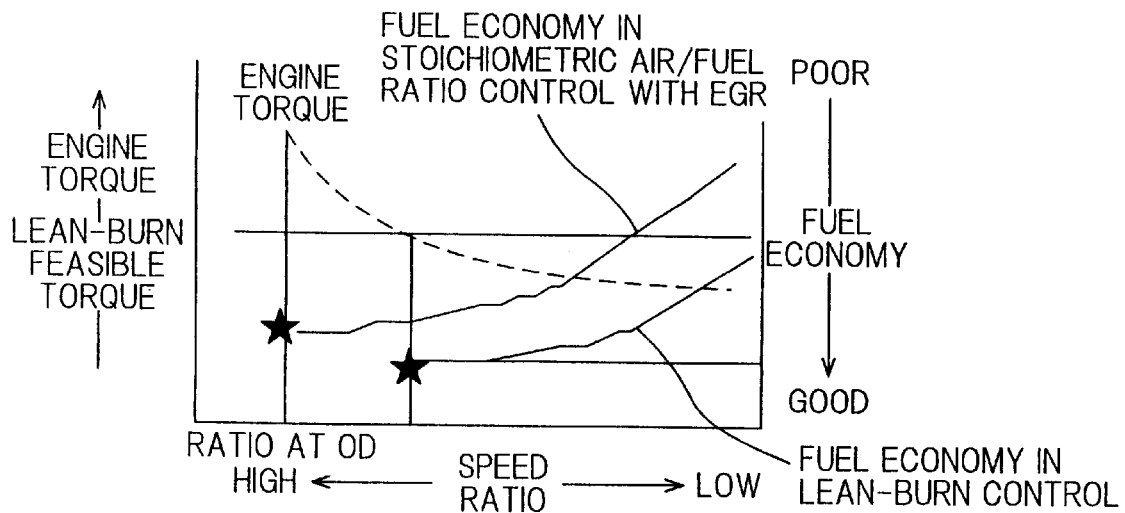
Figure 11:
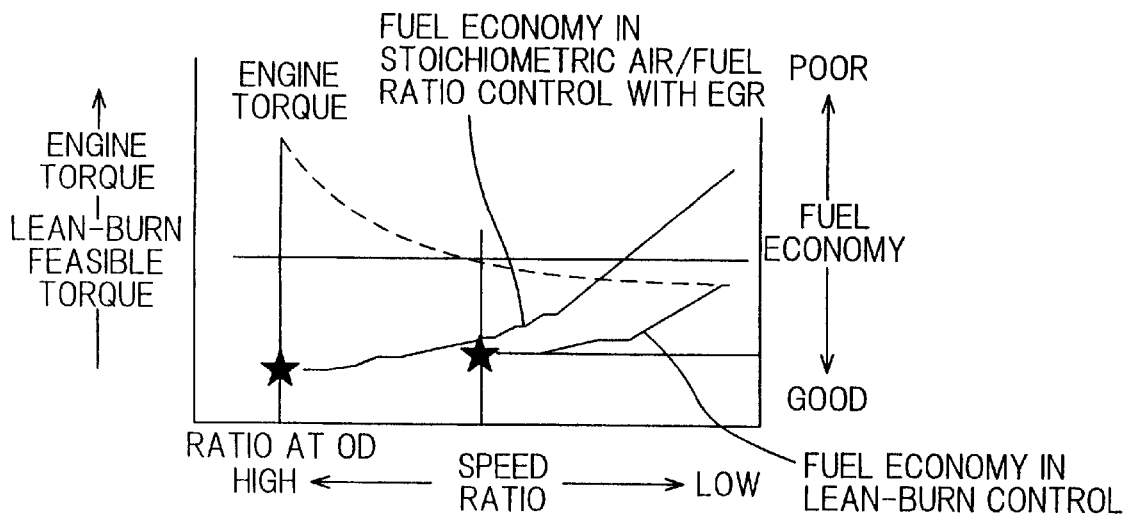

As can be seen from FIG. 10, when lean-burn control and stoichiometric air/fuel ratio control with EGR are compared regarding fuel economy, it is found that, for the same vehicle speed and the same motive force, lean-burn control at low ratio (i.e., large speed (gear) ratio) offers better fuel economy. However, as seen in FIG. 11, stoichiometric operation at the high ratio OD (overdrive) end (small speed (gear) ratio) may, depending on the circumstances, provide superior fuel economy. The control mode providing optimum fuel economy, i.e., minimum fuel consumption, is therefore determined beforehand for every combination of vehicle speed and motive force and mapped as shown in FIG. 9.

Figure 12:
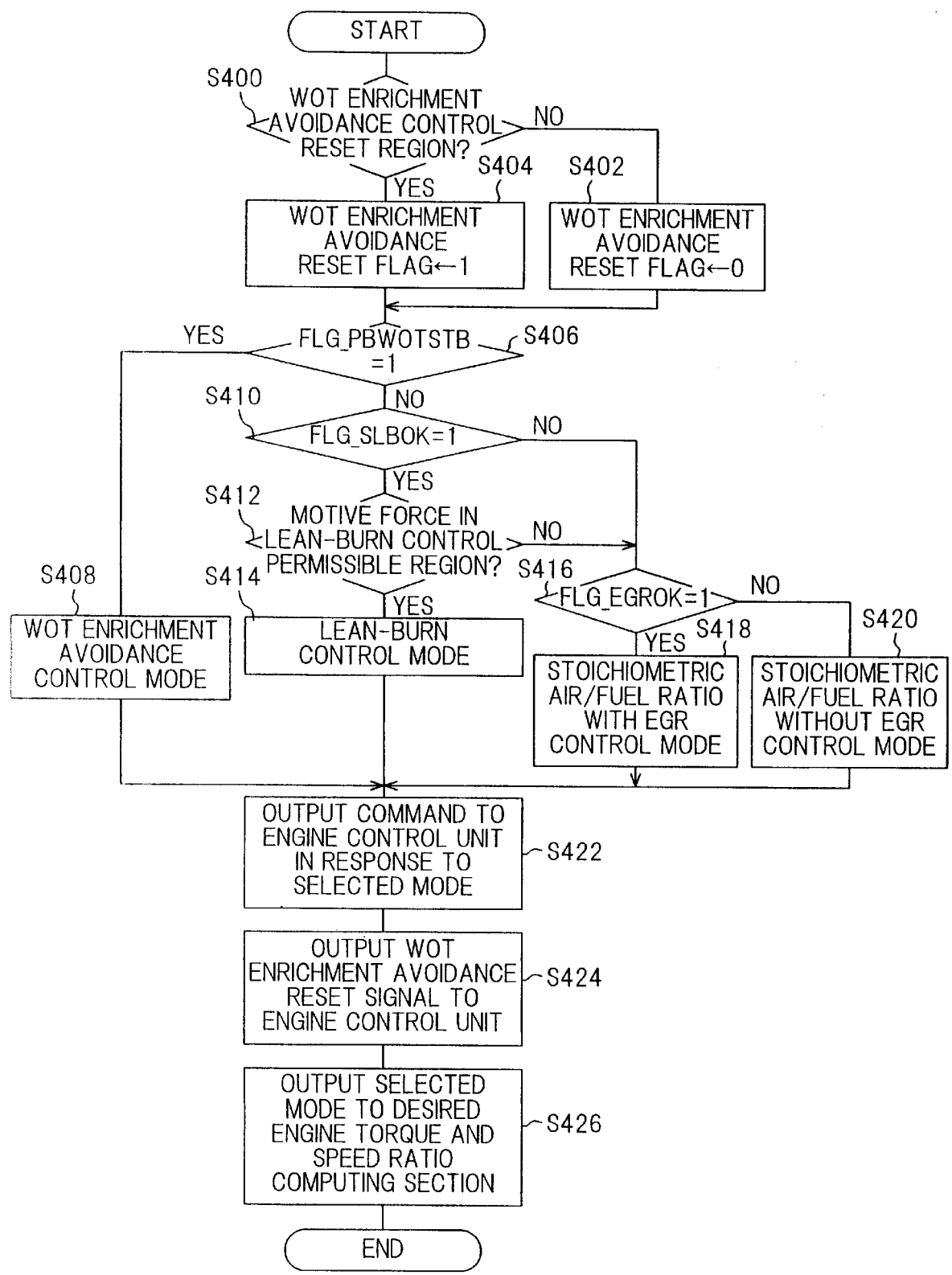
FIG. 12 is a flow chart showing the subroutine of the control mode selection referred to in the flow chart of FIG. 3.

FIG. 12 is a flow chart showing a subroutine for determining or selecting the engine control mode.

Figure 13:
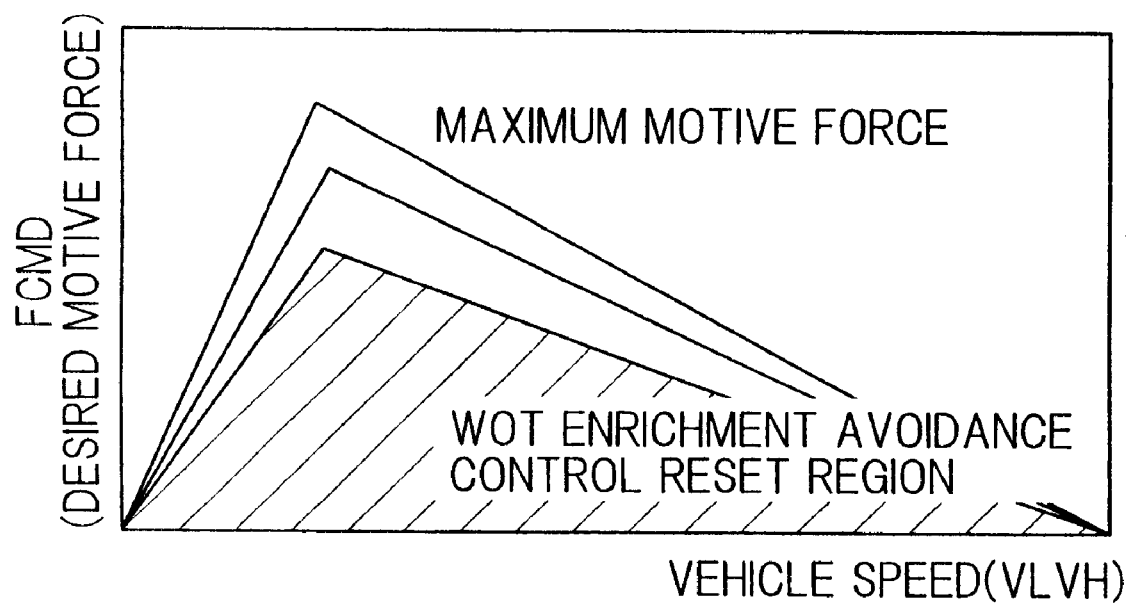
FIG. 13 is an explanatory graph showing a WOT enrichment avoidance control reset region.

First, in S400, a check is made with reference to the vehicle speed and desired motive force to determine whether the engine operation enters a preestablished WOT enrichment control avoidance reset region. This region will be explained with reference to FIG. 13.

The WOT enrichment avoidance reset region is defined as a region wherein, when the vehicle speed and the desired motive force are within prescribed ranges, the engine torque can achieve the motive force, without need to effect control at a torque in the region in which WOT enrichment control is conducted, by another control mode, namely, by the lean-burn control, the stoichiometric air/fuel ratio control with EGR, or the stoichiometric air/fuel ratio control without EGR. Since there is no need to avoid WOT enrichment, a reset signal will accordingly be provided.

When the result in S400 is NO, then, in S402, the WOT enrichment control avoidance mode is selected and the bit of the WOT enrichment avoidance reset flag is reset to 0. When the result in S400 is YES, the bit of the flag is set to 1 in S404.

Next, in S406, it is checked whether flag FLG_PBWOTSTB (WOT enrichment control standby) is set to 1, i.e., whether or not the WOT enrichment control standby is in effect.

The bit of this flag being set to 1 means that the aforesaid WOT enrichment control standby is in effect, more specifically, that the system is on the verge of entering a mode in which a desired air/fuel ratio is made rich so as to protect the engine. When the result in S406 is YES, the program therefore proceeds to S408, in which the WOT enrichment avoidance control mode is selected, more specifically, a control mode is established in which the speed (gear) ratio is determined so as to avoid the WOT enrichment operation.

This is based on the following reasoning. Under high engine load, the exhaust gas purification system is liable to be damaged by high-temperature exhaust gas. The ordinary practice for avoiding this is to lower the exhaust gas temperature by increasing the quantity of injected fuel to obtain an air/fuel ratio higher than stoichiometric air/fuel ratio. However, this degrades fuel economy and emission performance. In the system according to the invention, therefore, the WOT enrichment operation is avoided to the utmost possible, even when the operator desires high engine output (load).

When the result in S406 is NO, it is checked in S410 whether the flag FLG_SLBOK (lean-burn control) is set to 1, i.e., whether lean-burn air/fuel ratio control is possible. When the result is YES, the program goes to S412, in which it is determined from the desired motive force and the vehicle speed whether the it is within the lean-burn control permissible region.

Figure 16:
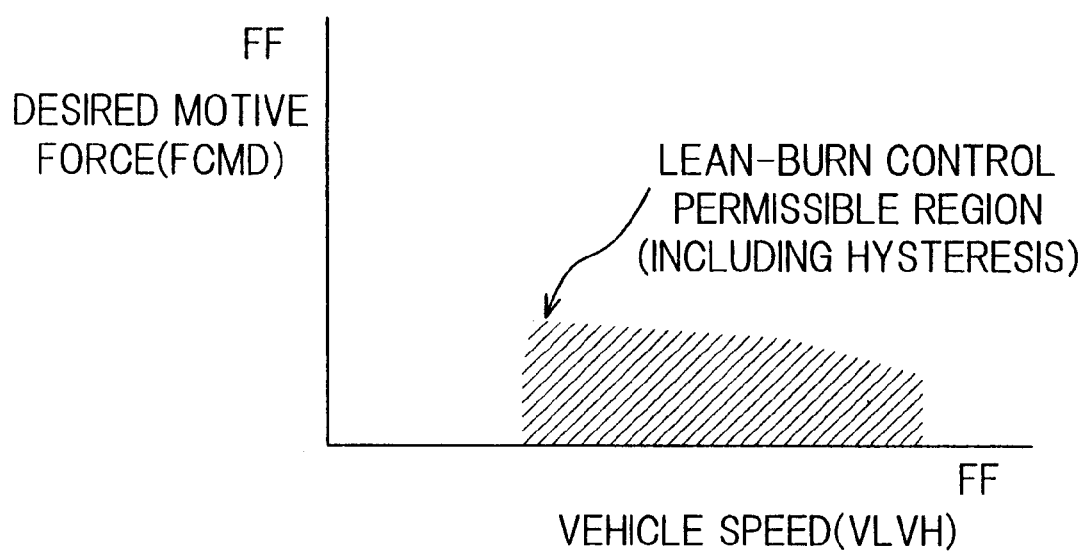
FIG. 16 is an explanatory graph showing a lean-burn control permissible region referred to in the flow chart of FIG. 12.

The characteristics of the lean-burn control permissible region are shown in FIG. 16. These characteristics are predetermined not only to improve fuel economy but also with consideration of enhanced emissions performance and drivability. Although they therefore do not always ensure optimum fuel economy, when set in this manner they enable lean-burn control to be avoided, when necessary for some reason, by changing these characteristics.

When the result in S412 is YES, lean-burn control is selected as the control mode in S414. When the result in S410 or S412 is NO, it is checked in S416 whether the bit of flag FLG_EGROK is set to 1. When the result is YES, a control mode is selected in S418 in which stoichiometric air/fuel ratio control with EGR is effected.

When the result in S416 is NO, i.e., when implementation of EGR would cause unstable combustion because, for example, the engine is cold, a control mode is selected in S420 in which stoichiometric air/fuel ratio control is effected without EGR.

Next, a control mode command is sent to the engine control unit 200 in response to the selected mode in S422 and the WOT enrichment avoidance reset signal (determined in S402 or S404) is sent to the engine control unit 200 in S424. By this flag FLG_PBWOTSTB is reset to 0 in the engine control unit 200. Next, in S426, a signal indicating the control mode is sent to the desired engine torque and desired speed (gear) ratio computing section 300c.

Figure 14:
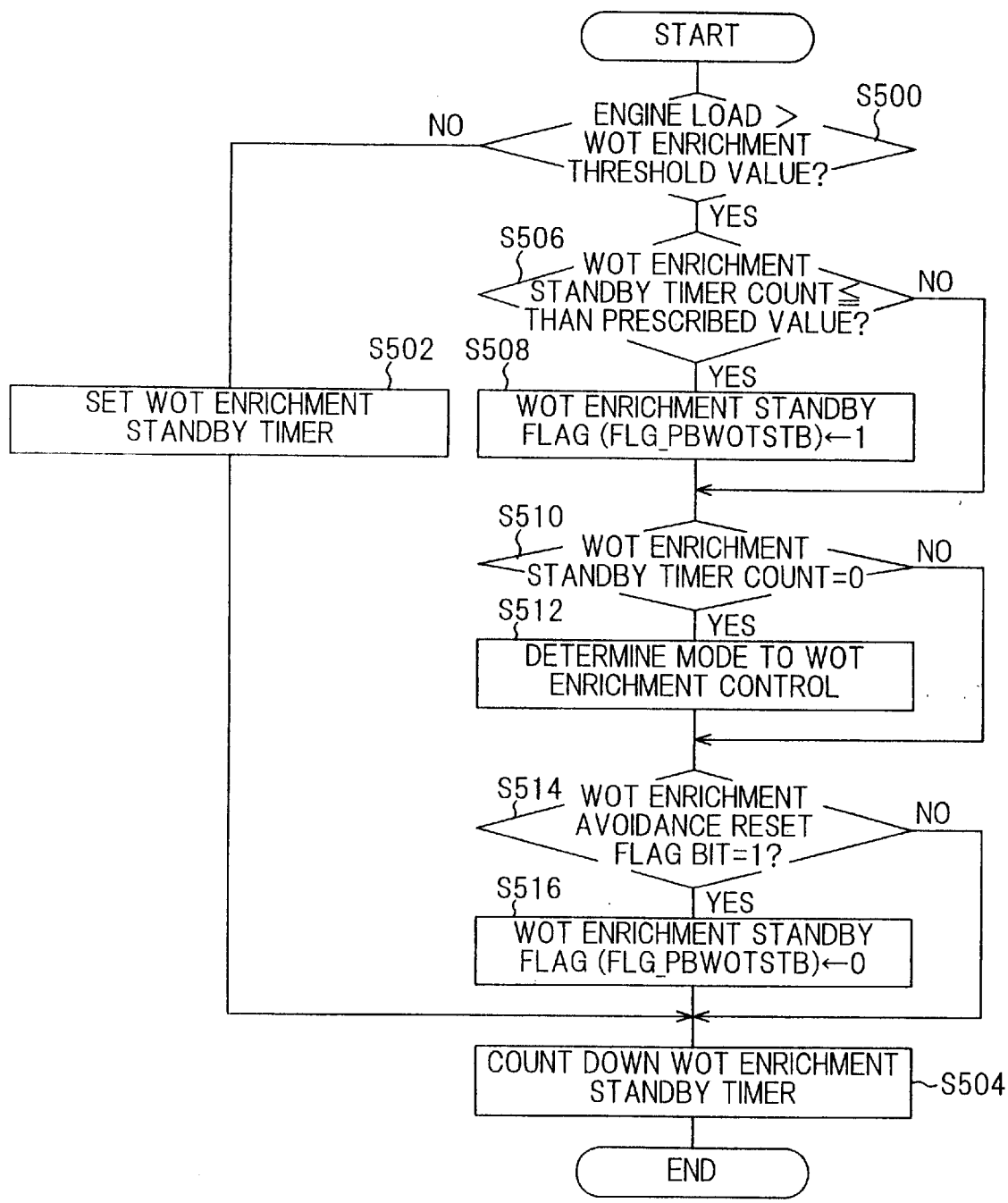
FIG. 14 is a flow chart showing the processing conducted at an engine control unit in parallel with that of FIG. 12.

FIG. 14 is a flow chart showing a subroutine executed by the engine control unit 200 based on the control mode command.

Figure 15:
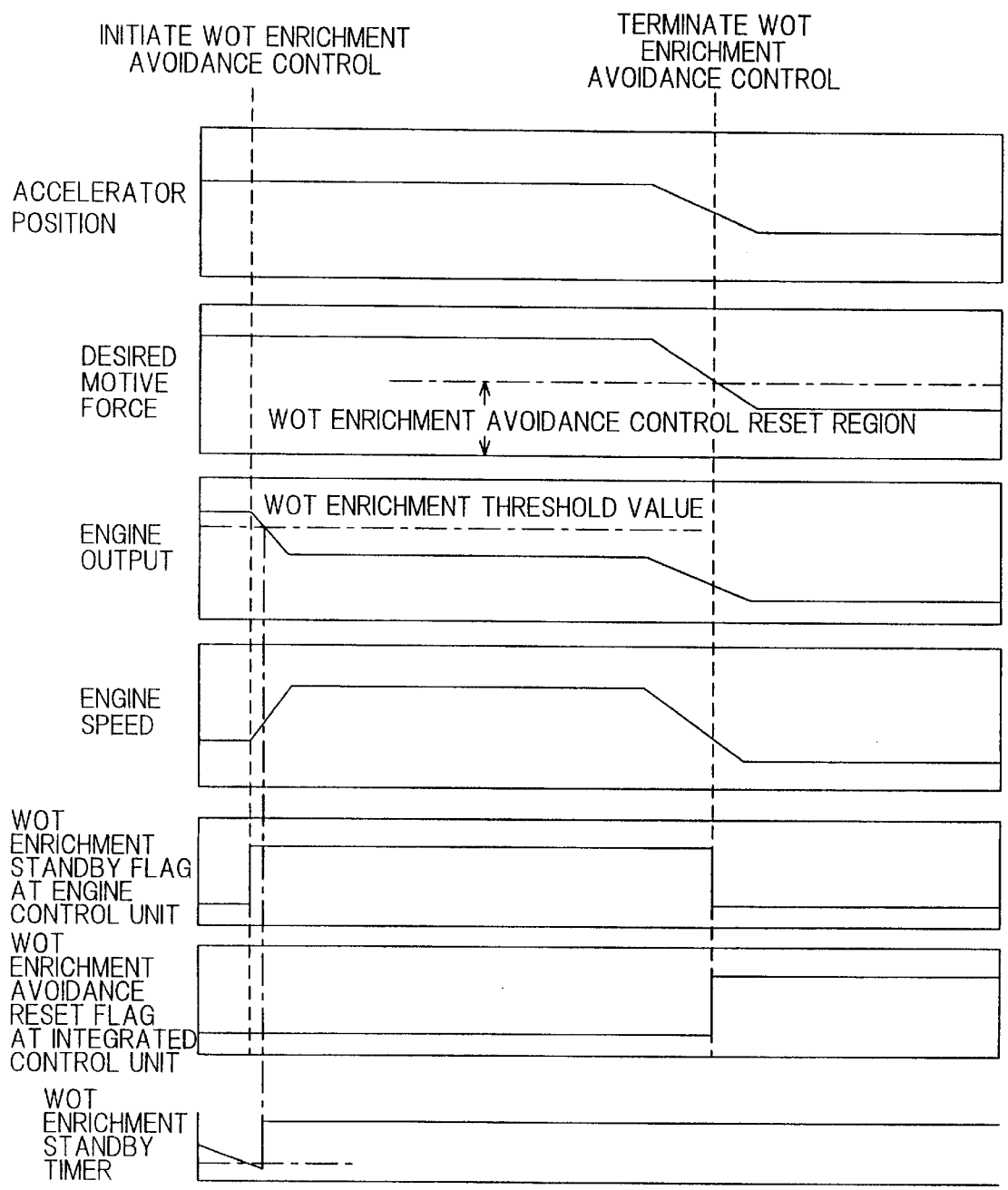
FIG. 15 is a time chart showing the processing shown in the flow charts of FIGS. 12 and 14.

First, in S500, it is checked whether the engine load (manifold absolute pressure PBA) exceeds a WOT enrichment threshold, i.e., whether the engine is under high load. When the result is NO, a WOT enrichment standby timer (down counter) is reset (started) in S502, whereafter time passage is clocked in S504. This is shown by the time chart of FIG. 15.

When the result in S500 is YES, it is checked in S506 whether the count of the WOT enrichment standby timer is equal to or greater than a prescribed value. When the result is YES, the bit of the WOT enrichment standby flag FLG_PBWOTSTB is set to 1 in S508. By this, as mentioned earlier, the integrated control unit 300 is informed that the WOT enrichment operation standby is in effect. When the result in S506 is NO, S508 is skipped.

Next, in S510, it is checked whether the count of the WOT enrichment standby timer has reached zero. When the result is YES, the control mode is determined to be the WOT enrichment operation, i.e., the bit of flag FLG_PBWOTSTB is set to 1. When the result in S510 is NO, S512 is skipped.

Next, in S514, it is checked whether the bit of the WOT enrichment avoidance reset flag is set to 1. (This flag is set/reset in the subroutine of FIG. 12.) When the result is YES, the bit of the WOT enrichment standby flag is set to 0 in S516. When the result is NO, S516 is skipped.

With the foregoing configuration, entry into the WOT enrichment avoidance control mode causes the speed (gear) ratio and the engine torque to be changed so as to shift the engine load to the high-speed, low-load side where wide-open-throttle (WOT) is not required, thereby effecting control that makes the WOT enrichment unnecessary.

Figure 21:
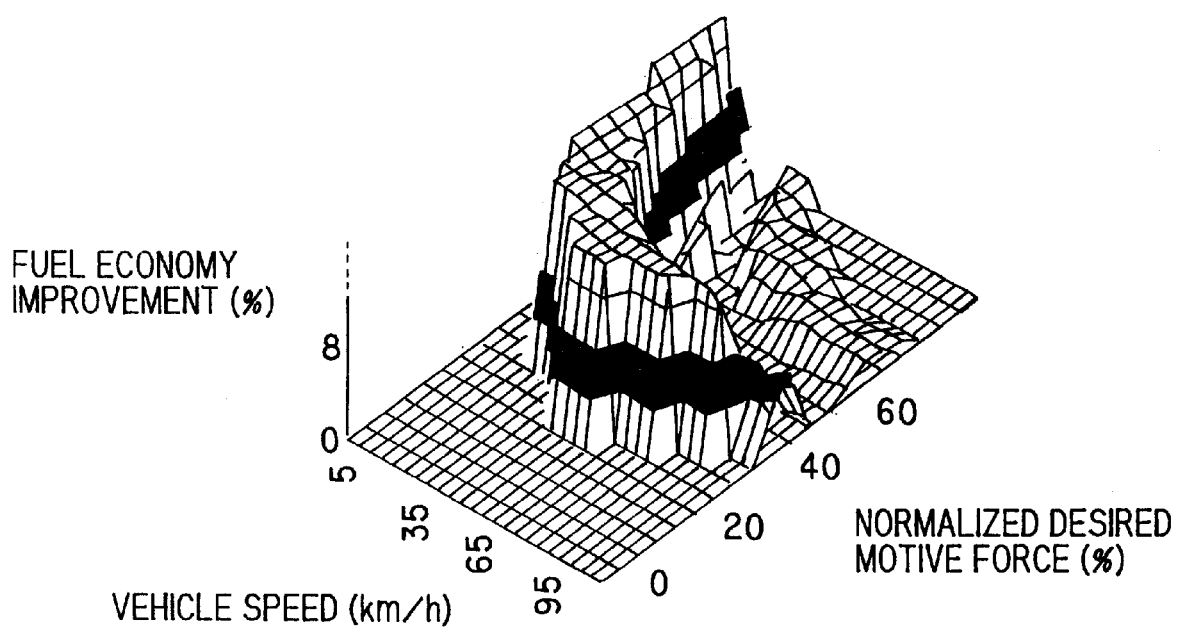
FIG. 21 is an explanatory graph showing the enhancement of fuel consumption achieved by the processing shown in FIG. 12.

In other words, improved fuel economy can be achieved without degrading drivability even when the WOT enrichment avoidance control mode is in effect because this mode shifts to a good fuel economy operation point providing the same motive force at low engine speed as in the case of effecting the WOT enrichment control at high-load engine torque. To give a concrete example, as shown in FIG. 21 to be discussed in more detail below, fuel economy (FE) can be improved in the black region of the low-vehicle-speed, high-load region. Moreover, since the fact that operation in the WOT enrichment avoidance control is effected at the stoichiometric air/fuel ratio means that the range of stoichiometric air/fuel ratio operation is broadened, emission performance is also improved.

Next, in S16 of FIG. 3, the desired throttle opening THCMD for the selected control mode is calculated.

Figure 17:
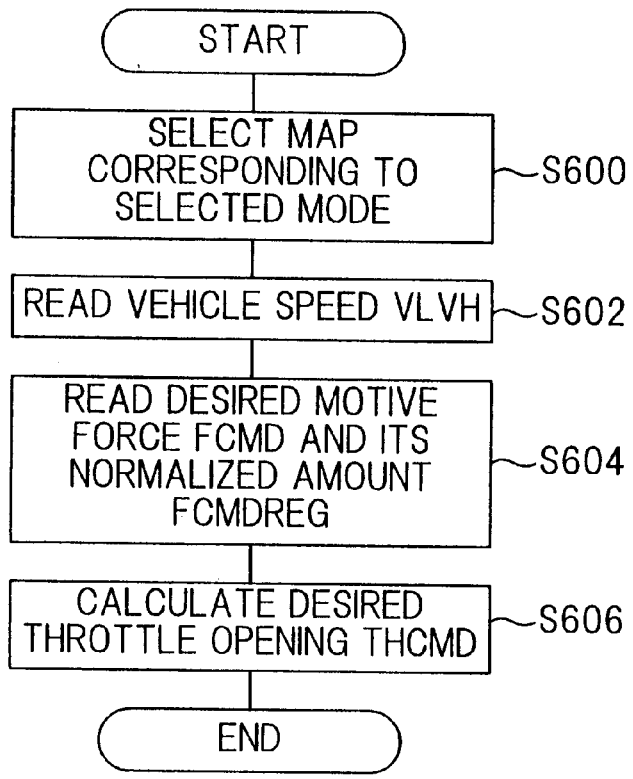
FIG. 17 is a flow chart showing the subroutine of desired throttle opening calculation referred to in the flow chart of FIG. 3.

The subroutine for this is shown in FIG. 17.

Figure 18:
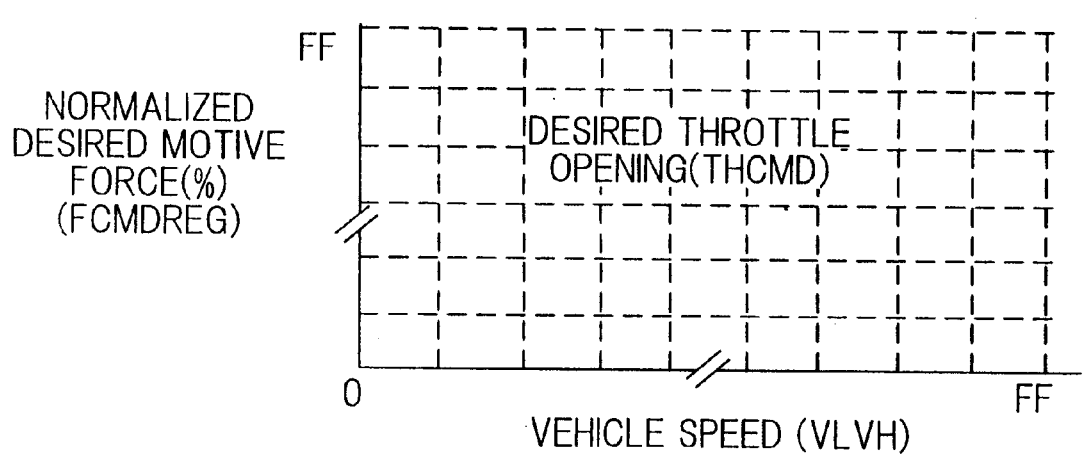
FIG. 18 is an explanatory graph showing the characteristics of a map referred to in the flow chart of FIG. 17.

First, in S600, the map (characteristics) corresponding to the selected control mode is selected. The vehicle speed VLVH is then read in S602 and the desired motive force FCMD and its normalized amount FCMDREG are read in S604. Then, in S606, the desired throttle opening THCMD is calculated. The relevant characteristics are shown in FIG. 18. The map retrieval is effected using the normalized value FCMDREG, not the final value FCMD, because, as explained earlier, this enables the data to be set with the same accuracy irrespective of vehicle speed.

Next, in S18 of FIG. 3, the desired NDR (NDRCMD) is calculated.

Figure 19:
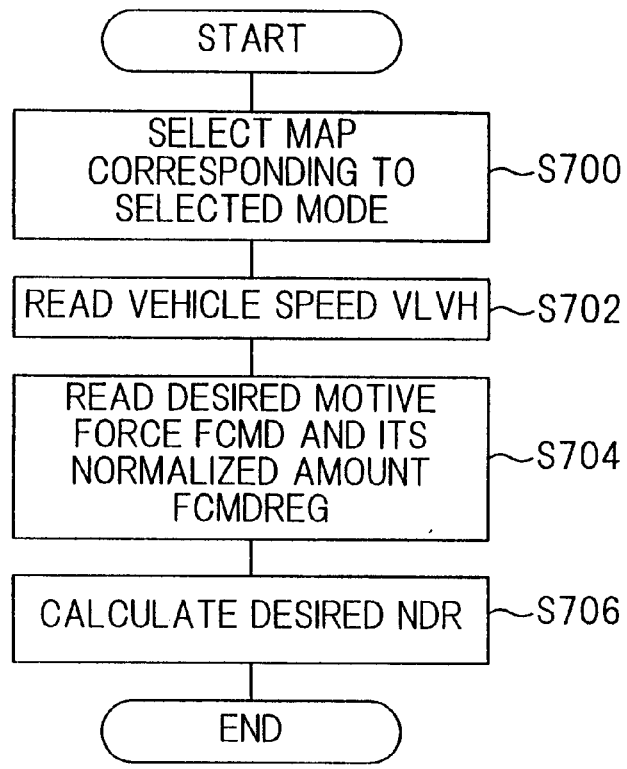
FIG. 19 is a flow chart showing the subroutine of desired NDR calculation referred to in the flow chart of FIG. 3.

The subroutine for this is shown in FIG. 19.

Figure 20:
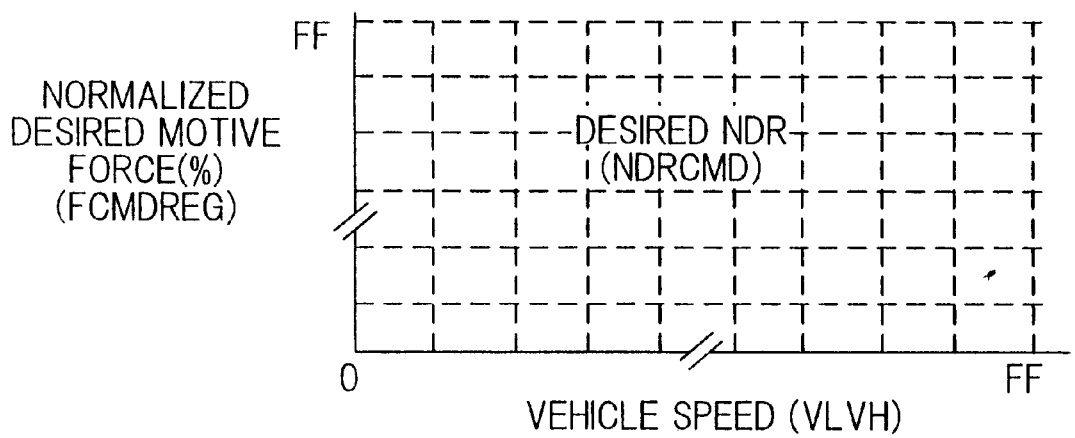
FIG. 20 is an explanatory graph showing the characteristics of a map referred to in the flow chart of FIG. 17.

First, in S700 the map (characteristics) corresponding to the selected control mode is selected. The vehicle speed VLVH is then read in S702 and the desired motive force FCMD and its normalized amount FCMDREG are read in S704. Then, in S706, the desired NDR (NDRCMD) is calculated. The relevant characteristics are shown in FIG. 20. The normalized value FCMDREG is again for the same reason used for the map retrieval.

Next, in S20 of FIG. 3, the calculated engine control mode command value, the desired throttle opening THCMD and the desired NDR (NDRCMD) are output to the engine control unit 200, the throttle control unit 400 and the transmission control unit 100.

This causes the engine control unit 200 to operate the engine in accordance with the instructed mode, and the throttle control unit 400 to drive the stepper motor 18 so as to obtain the desired throttle valve opening, more specifically, the desired engine output.

In addition, the transmission control unit 100 controls the speed (gear) ratio so as to obtain the desired NDR. Specifically, it supplies oil pressure to the drive-side movable pulley 34 and the driven-side movable pulley 46 and effects feedback control for making the drive pulley rotational speed NDR (input speed) converge to the desired NDR.

The embodiment is thus configured to have a system for controlling motive force of a vehicle having an engine (10) and an automatic transmission (a belt-drive continuously variable transmission CVT 24) connected to the engine to transmit engine torque to a drive shaft of the vehicle, comprising: operating condition detecting means (accelerator position sensor 110, vehicle speed sensor 122, etc., S10) for detecting operating conditions of the vehicle including at least an accelerator position (ACC) and a vehicle speed (VLVH), and operating conditions of the engine including at least an engine warmup state, an engine speed and an engine load; desired motive force determining means (desired load (motive force) determining section 300a, S12) for determining a desired motive force (FCMD) to be generated by the vehicle based on at least the detected accelerator position and vehicle speed; option signal generating means (engine control unit 200, S104) for generating options signal in response to the detected engine operating condition; control mode selecting means (engine control mode selection section 300b, S14, S400 to S426) for selecting one from among a plurality of predetermined control modes in response to the determined desired motive force and the options signal; desired engine output calculating means (desired engine torque and desired speed (gear) ratio computing section 300c, S16, S18) for calculating a desired output of the engine and a manipulated variable to be supplied to the automatic transmission in accordance with the selected control mode based on at least the calculated desired motive force; actuator control means (throttle control unit 400) for controlling operation of an actuator (stepper motor 18) which regulates the output of the engine in response to the calculated desired output of the engine; and shift control means (transmission control unit 100) for controlling a gear ratio (desired NDR) of the automatic transmission in response to the calculated manipulated variable.

In the system, the plurality of predetermined control modes includes at least a mode for controlling an air/fuel ratio of the engine to a stoichiometric air/fuel ratio (S418, S420) and a mode for controlling the air/fuel ratio of the engine to an air/fuel ratio leaner than the stoichiometric air/fuel ratio (S414).

In other words, the control mode options available based solely on the engine operating conditions and considerations are determined, and the one of the available modes that offers optimum (minimum) fuel economy in light of the desired load of the vehicle, specifically, in light of the desired motive force (and vehicle speed), is selected, whereafter the combination of desired torque (desired motive force) and speed (gear) ratio suitable for the selected control mode is determined.

Within the constraint of the available engine control modes, therefore, the combination of engine torque and speed (gear) ratio that offers the best fuel economy at the desired motive force can be secured and fuel consumption can be minimized, irrespective of the engine operating condition and states, even during engine cold start and warmup. FIG. 21 shows the improvement in fuel economy enabled by the WOT enrichment avoidance control in comparison with the case where such control is not effected. The black portion in the figure is the region of improved fuel economy. As shown, the fuel economy is markedly improved in the low-vehicle-speed and high-load region.

The absolute value of the maximum motive force that a vehicle can produce generally decreases with increasing vehicle speed. In the system according to the invention, however, since the desired motive force is normalized between the maximum value and the minimum value and the normalized values are used for map retrieval, the system enables improved retrieval resolution of the desired engine torque and speed (gear) ratio over the entire range from the lowest to the highest vehicle speed.

Since the desired motive force is calculated using a steady-state characteristic portion and a transient characteristic portion, the motive force can be matched to the actual vehicle operating condition and determined taking into account the response speed of the engine torque and speed (gear) ratio changing. The desired operating point can therefore be constantly tracked to ensure optimum fuel economy.

The system is further configured to avoid the WOT enrichment as extensively as possible in the engine high-load region. This further enhances fuel economy.

Moreover, the embodiment is configured to have a system for controlling motive force of a vehicle having an engine (10) and an automatic transmission (belt-drive continuously variable transmission CVT 24) connected to the engine to transmit engine torque to a drive shaft of the vehicle, comprising: operating condition detecting means (accelerator position sensor 110, vehicle speed sensor 122, etc., S10) for detecting operating conditions of the vehicle including at least an accelerator position (ACC) and a vehicle speed (VLVH), and operating conditions of the engine including at least an engine warmup state, an engine speed and an engine load; wide-open-throttle motive force calculating means (desired load (motive force) determining section 300a, S12, S204, S300) for calculating a wide-open-throttle motive force (FCMDWOT) generated based at least on the detected vehicle speed when a throttle valve of the engine is fully opened; full-closed-throttle motive force calculating means (desired load (motive force) determining section 300a, S12, S204, S300) for calculating a full-closed-throttle motive force (FCMDOFF) generated based at least on the detected vehicle speed when a throttle valve of the engine is fully closed; motive force ratio calculating means (desired load (motive force) determining section 300a, S12, S204, S300) for calculating a ratio of motive force (partial motive force ratio FREGMAP) at the detected vehicle speed relative to the detected accelerator position; and desired motive force calculating means (desired load (motive force) determining section 300a, S12, S204, S300 to S320) for calculating the desired motive force (FCMD (FCMDREG)) by obtaining a difference between the wide-open-throttle motive force and the full-closed-throttle motive force and by multiplying the difference by the calculated ratio of motive force.

As mentioned above, the maximum motive force that a vehicle can produce generally decreases with increasing vehicle speed. With this arrangement, however, since the desired motive force is normalized between the maximum value and the minimum value and the normalized values are used for map retrieval, the system enables improved retrieval resolution of the desired engine torque and speed (gear) ratio over the entire range from the lowest to the highest vehicle speed.

In the system, the desired motive force determining means further includes: error calculating means (S306) for calculating an error (SFCMD) between the desired motive force calculated currently (FCMDMAP) and that calculated previously (FCMD(k−1); and desired motive force correcting means (S308 to S320) for correcting the currently calculated desired motive force by the calculated error. More specifically, the desired motive force determining means further includes: error calculating means (S306) for calculating an error (SFCMD) between the desired motive force calculated currently (FCMDMAP) and that calculated previously (FCMD(k−1) to determine a desired motive force response adjustment term DFCMD; and desired motive force correcting means (S308 to S320) for correcting the desired motive force calculated currently by the calculated error. (FCMD=FCMDMAP+DFCMD).

In other words, the desired motive force is determined or calculated taking the response delay of the engine and automatic transmission, it becomes possible to determine the desired motive force that the vehicle can generate reliably. Moreover, the steady-state motive force is determined taking the fuel economy enhancement into account, while the transient motive force is determined taking the drivability improvement into account, making it possible to determine both separately so as to balance the advantages thereof, and to enlarge the freedom of motive force calculation.

In FIG. 8, the characteristics of the steady-state motive force computing section and the dynamic characteristic computing section can be configured such that they are switched by an external switch. If so configured, the characteristics can be easily changed to, for example, increase the steady-state motive force relative to the accelerator position if sport-like driving is demanded, or to change the correction characteristics in the dynamic characteristic computing section to raise the response in a transient operation.

Furthermore, the system is configured to have a system for controlling motive force of a vehicle having an engine (10) and an automatic transmission (belt-drive continuously variable transmission CVT 24) connected to the engine to transmit engine torque to a drive shaft of the vehicle, comprising: operating condition detecting means (accelerator position sensor 110, vehicle speed sensor 122, etc., S10) for detecting operating conditions of the vehicle including at least an accelerator position (ACC) and a vehicle speed (VLVH), and operating conditions of the engine including at least an engine warmup state, an engine speed and an engine load; desired motive force determining means (desired load (motive force) determining sections 300a, S12) for determining a desired motive force (FCMD) to be generated by the vehicle based on at least the detected accelerator position and vehicle speed; desired engine output calculating means (engine control unit 200, desired engine torque and desired speed (gear) ratio computing section 300c, S16, S18, S500 to S516) for calculating a desired output of the engine (THCMD) and a desired gear ratio of the automatic transmission (desired NDR) based on at least the determined desired motive force and the detected engine operating conditions; high engine load determining means (S500 to S516) for determining whether the engine is under high load; discriminating means for discriminating whether the calculated gear ratio can achieve the determined desired motive force; changing means for changing the calculated desired output of the engine and the desired gear ratio when the determined desired motive force can be achieved; actuator control means (throttle control unit 400) for controlling operation of an actuator (stepper motor 18) which regulates the output of the engine in response to the desired output of the engine; and shift control means (transmission control unit 100) for controlling a gear ratio of the automatic transmission in response to the desired gear ratio.

In the system, the changing means changes the calculated desired output of the engine and the desired gear ratio when the engine is determined to be under high load for a predetermined period (S506).

In the system, the desired engine output calculating means changes the calculated desired output of the engine and the desired gear ratio such that the desired motive force is generated when the desired motive force is discriminated to be achievable (S500 to S516).

In the system, the desired engine output calculating means changes the desired gear ratio such that the desired motive force is generated when the engine is controlled to avoid a wide-open-throttle enrichment (S500 to S516).

The desired motive force need not be determined by retrieval from a map prepared beforehand as in the foregoing embodiment but can instead be determined by calculation.

Further, the desired engine output is expressed as throttle valve opening in the foregoing embodiment but some other value such as amount of fuel consumption or intake air quantity can be adopted instead. The transmission manipulated variable is expressed as NDR (input speed) in the foregoing embodiment but the speed (gear) ratio or its change rate can be adopted instead.

The foregoing embodiment varies the engine output by varying the desired throttle opening THCMD of an electronically controlled throttle valve. The invention is not limited to this configuration, however, and can instead vary the engine output by the method, adopted in some recently developed direct-fuel-injection engines and diesel engines, of mapping the desired engine torque and controlling the quantity of fuel injection or the desired air/fuel ratio according to the torque.

When the invention is applied to a direct-fuel-injection engine, the options signal can further include information regarding the possibility of ultra-lean-burn control utilizing stratified combustion.

Although the foregoing description was made with reference to an example using a continuously variable transmission of the metal belt type, the invention can also be effectively applied to one of the rubber belt type or toroidal type. The system can not only be configured to utilize a continuously variable transmission but also be configured to select the optimum gear of a multi-step transmission. The slip rate of a lockup clutch can be utilized instead. More specifically, the gear shift, the motive force difference resulting from the lockup clutch ON/OFF operation, the WOT enrichment avoidance region, the fuel economy at WOT can taken into account, solely or in combination, to determine the engine control region, gear shift and lockup clutch capacitor limit value, etc.

The transmission structure is not limited to that illustrated. A torque converter can be connected to the output shaft 20 of the engine 10 and a torque converter can be used in place of the start clutch 42. The dual-mass flywheel 26 can be eliminated.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling motive force of a vehicle having an engine and an automatic transmission connected to the engine to transmit engine torque to a drive shaft of the vehicle, comprising:

operating condition detecting means for detecting operating conditions of the vehicle including at least an accelerator position and a vehicle speed, and operating conditions of the engine including at least an engine warmup state, an engine speed and an engine load;

desired motive force determining means for determining a desired motive force to be generated by the vehicle based on at least the detected accelerator position and vehicle speed;

option signal generating means for generating options signal in response to the detected engine operating condition;

control mode selecting means for selecting one from among a plurality of predetermined control modes in response to the determined desired motive force and the options signal;

desired engine output calculating means for calculating a desired output of the engine and a manipulated variable to be supplied to the automatic transmission in accordance with the selected control mode based on at least the calculated desired motive force;

actuator control means for controlling operation of an actuator which regulates the output of the engine in response to the calculated desired output of the engine; and shift control means for controlling a gear ratio of the automatic transmission in response to the calculated manipulated variable.

2. A system according to claim 1, wherein the plurality of predetermined control modes includes at least a mode for controlling an air/fuel ratio of the engine to a stoichiometric air/fuel ratio and a mode for controlling the air/fuel ratio of the engine to an air/fuel ratio leaner than the stoichiometric air/fuel ratio.

3. A system according to claim 1, wherein the desired motive force determining means includes:

wide-open-throttle motive force calculating means for calculating a wide-open-throttle motive force generated based at least on the detected vehicle speed when a throttle valve of the engine is fully opened;

full-closed-throttle motive force calculating means for calculating a full-closed-throttle motive force generated based at least on the detected vehicle speed when a throttle valve of the engine is fully closed;

motive force ratio calculating means for calculating a ratio of motive force at the detected vehicle speed relative to the detected accelerator position; and desired motive force calculating means for calculating the desired motive force by obtaining a difference between the wide-open-throttle motive force and the full-closed-throttle motive force and by multiplying the difference by the calculated ratio of motive force.

4. A system according to claim 3, wherein the desired motive force determining means further includes:

error calculating means for calculating an error between the desired motive force calculated currently and that calculated previously; and desired motive force correcting means for correcting the currently calculated desired motive force by the calculated error.

5. A system for controlling motive force of a vehicle having an engine and an automatic transmission connected to the engine to transmit engine torque to a drive shaft of the vehicle, comprising:

operating condition detecting means for detecting operating conditions of the vehicle including at least an accelerator position and a vehicle speed, and operating conditions of the engine including at least an engine warmup state, an engine speed and an engine load;

desired motive force determining means for determining a desired motive force to be generated by the vehicle based on at least the detected accelerator position and vehicle speed;

desired engine output calculating means for calculating a desired output of the engine and a desired gear ratio of the automatic transmission based on at least the determined desired motive force and the detected engine operating conditions;

high engine load determining means for determining whether the engine is under high load;

discriminating means for discriminating whether the calculated gear ratio can achieve the determined desired motive force;

changing means for changing the calculated desired output of the engine and the desired gear ratio when the determined desired motive force can be achieved;

actuator control means for controlling operation of an actuator which regulates the output of the engine in response to the desired output of the engine; and shift control means for controlling a gear ratio of the automatic transmission in response to the desired gear ratio.

6. A system according to claim 5, wherein the changing means changes the calculated desired output of the engine and the desired gear ratio when the engine is determined to be under high load for a predetermined period.

7. A system according to claim 5, wherein the desired engine output calculating means changes the calculated desired output of the engine and the desired gear ratio such that the desired motive force is generated when the desired motive force is discriminated to be achievable.

8. A system according to claim 7, wherein the desired engine output calculating means changes the desired gear ratio such that the desired motive force is generated when the engine is controlled to avoid a wide-open-throttle enrichment.

9. A system for controlling motive force of a vehicle having an engine and an automatic transmission connected to the engine to transmit engine torque to a drive shaft of the vehicle, comprising:

operating condition detecting means for detecting operating conditions of the vehicle including at least an accelerator position and a vehicle speed, and operating conditions of the engine including at least an engine warmup state, an engine speed and an engine load;

wide-open-throttle motive force calculating means for calculating a wide-open-throttle motive force generated based at least on the detected vehicle speed when a throttle valve of the engine is fully opened;

full-closed-throttle motive force calculating means for calculating a full-closed-throttle motive force generated based at least on the detected vehicle speed when a throttle valve of the engine is fully closed;

motive force ratio calculating means for calculating a ratio of motive force at the detected vehicle speed relative to the detected accelerator position; and desired motive force calculating means for calculating the desired motive force by obtaining a difference between the wide-open-throttle motive force and the full-closed-throttle motive force and by multiplying the difference by the calculated ratio of motive force.

10. A system according to claim 9, wherein the desired motive force determining means further includes:

error calculating means for calculating an error between the desired motive force calculated currently and that calculated previously; and desired motive force correcting means for correcting the desired motive force calculated currently by the calculated error.

11. A method of controlling motive force of a vehicle having an engine and an automatic transmission connected to the engine to transmit engine torque to a drive shaft of the vehicle, comprising the steps of:

detecting operating conditions of the vehicle including at least an accelerator position and a vehicle speed, and operating conditions of the engine including at least an engine warmup state, an engine speed and an engine load;

determining a desired motive force to be generated by the vehicle based on at least the detected accelerator position and vehicle speed;

generating options signal in response to the detected engine operating condition;

selecting one from among a plurality of predetermined control modes in response to the determined desired motive force and the options signal;

calculating a desired output of the engine and a manipulated variable to be supplied to the automatic transmission in accordance with the selected control mode based on at least the calculated desired motive force;

controlling operation of an actuator which regulates the output of the engine in response to the calculated desired output of the engine; and controlling a gear ratio of the automatic transmission in response to the calculated manipulated variable.

12. A method according to claim 11, wherein the plurality of predetermined control modes includes at least a mode for controlling an air/fuel ratio of the engine to a stoichiometric air/fuel ratio and a mode for controlling the air/fuel ratio of the engine to an air/fuel ratio leaner than the stoichiometric air/fuel ratio.

13. A method according to claim 11, wherein the step of desired motive force determination includes the steps of:

calculating a wide-open-throttle motive force generated based at least on the detected vehicle speed when a throttle valve of the engine is fully opened;

calculating a full-closed-throttle motive force generated based at least on the detected vehicle speed when a throttle valve of the engine is fully closed;

calculating a ratio of motive force at the detected vehicle speed relative to the detected accelerator position; and calculating the desired motive force by obtaining a difference between the wide-open-throttle motive force and the full-closed-throttle motive force and by multiplying the difference by the calculated ratio of motive force.

14. A method according to claim 13, wherein the step of desired motive force determination further includes the step of:

calculating an error between the currently calculated desired motive force and that calculated previously; and correcting the desired motive force calculated currently by the calculated error.

15. A method of controlling motive force of a vehicle having an engine and an automatic transmission connected to the engine to transmit engine torque to a drive shaft of the vehicle, comprising the steps of:

detecting operating conditions of the vehicle including at least an accelerator position and a vehicle speed, and operating conditions of the engine including at least an engine warmup state, an engine speed and an engine load;

determining a desired motive force to be generated by the vehicle based on at least the detected accelerator position and vehicle speed;

calculating a desired output of the engine and a desired gear ratio of the automatic transmission based on at least the determined desired motive force and the detecting operating conditions;

determining whether the engine is under high load;

discriminating whether the calculated gear ratio can achieve the determined desired motive force;

changing the calculated desired output of the engine and the desired gear ratio when the determined desired motive force can be achieved;

controlling operation of an actuator which regulates the output of the engine in response to the desired output of the engine; and controlling a gear ratio of the automatic transmission in response to the desired gear ratio.

16. A method according to claim 15, wherein the calculated desired output of the engine and the desired gear ratio are changed when the engine is determined to be under high load for a predetermined period.

17. A method according to claim 15, wherein the calculated desired output of the engine and the desired gear ratio are changed such that the desired motive force is generated when the desired motive force is discriminated to be achievable.

18. A method according to claim 17, wherein the desired gear ratio is changed such that the desired motive force is generated when the engine is controlled to avoid a wide-open-throttle enrichment.

19. A method of controlling motive force of a vehicle having an engine and an automatic transmission connected to the engine to transmit engine torque to a drive shaft of the vehicle, comprising the steps of:

detecting operating conditions of the vehicle including at least an accelerator position and a vehicle speed, and operating conditions of the engine including at least an engine warmup state, an engine speed and an engine load;

calculating means for calculating a wide-open-throttle motive force generated based at least on the detected vehicle speed when a throttle valve of the engine is fully opened;

calculating a full-closed-throttle motive force generated based at least on the detected vehicle speed when a throttle valve of the engine is fully closed;

calculating a ratio of motive force at the detected vehicle speed relative to the detected accelerator position; and calculating the desired motive force by obtaining a difference between the wide-open-throttle motive force and the full-closed-throttle motive force and by multiplying the difference by the calculated ratio of motive force.

20. A method according to claim 19, wherein the step of desired motive force determination further includes the steps of:

calculating an error between the desired motive force calculated currently and that calculated previously; and correcting means for correcting the desired motive force calculated currently by the calculated error.

21. A computer program embodied on a computer-readable medium for controlling motive force of a vehicle having an engine and an automatic transmission connected to the engine to transmit engine torque to a drive shaft of the vehicle, comprising the steps of:

detecting operating conditions of the vehicle including at least an accelerator position and a vehicle speed, and operating conditions of the engine including at least an engine warmup state, an engine speed and an engine load;

determining a desired motive force to be generated by the vehicle based on at least the detected accelerator position and vehicle speed;

generating options signal in response to the detected engine operating condition;

selecting one from among a plurality of predetermined control modes in response to the determined desired motive force and the options signal;

calculating a desired output of the engine and a manipulated variable to be supplied to the automatic transmission in accordance with the selected control mode based on at least the calculated desired motive force;

controlling operation of an actuator which regulates the output of the engine in response to the calculated desired output of the engine; and controlling a gear ratio of the automatic transmission in response to the calculated manipulated variable.

22. A computer program embodied on a computer-readable medium for controlling motive force of a vehicle having an engine and an automatic transmission connected to the engine to transmit engine torque to a drive shaft of the vehicle, comprising the steps of:

detecting operating conditions of the vehicle including at least an accelerator position and a vehicle speed, and operating conditions of the engine including at least an engine warmup state, an engine speed and an engine load;

determining a desired motive force to be generated by the vehicle based on at least the detected accelerator position and vehicle speed;

calculating a desired output of the engine and a desired gear ratio of the automatic transmission based on at least the determined desired motive force and the detected operating condition;

determining whether the engine is under high load;

discriminating whether the calculated gear ratio can achieve the determined desired motive force;

changing the calculated desired output of the engine and the desired gear ratio when the determined desired motive force can be achieved;

controlling operation of an actuator which regulates the output of the engine in response to the desired output of the engine; and controlling a gear ratio of the automatic transmission in response to the desired gear ratio.

23. A computer program embodied on a computer-readable medium for controlling motive force of a vehicle having an engine and an automatic transmission connected to the engine to transmit engine torque to a drive shaft of the vehicle, comprising the steps of:

detecting operating condition of the vehicle including at least an accelerator position and a vehicle speed, and operating condition of the engine including at least an engine warmup state, an engine speed and an engine load;

calculating means for calculating a wide-open-throttle motive force generated based at least on the detected vehicle speed when a throttle valve of the engine is fully opened;

calculating a full-closed-throttle motive force generated based at least on the detected vehicle speed when a throttle valve of the engine is fully closed;

calculating a ratio of motive force at the detected vehicle speed relative to the detected accelerator position; and calculating the desired motive force by obtaining a difference between the wide-open-throttle motive force and the full-closed-throttle motive force and by multiplying the difference by the calculated ratio of motive force.

* * * * *